(12) United States Patent
Good et al.

(10) Patent No.: US 10,868,958 B2
(45) Date of Patent: *Dec. 15, 2020

(54) METHODS FOR CONSTRUCTING A COLOR COMPOSITE IMAGE

(71) Applicant: Hand Held Products, Inc., Fort Mill, SC (US)

(72) Inventors: Timothy Good, Indian Land, SC (US); Patrick Anthony Giordano, Glassboro, NJ (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/789,690

(22) Filed: Feb. 13, 2020

(65) Prior Publication Data

US 2020/0186704 A1  Jun. 11, 2020

Related U.S. Application Data

(63) Continuation of application No. 15/725,753, filed on Oct. 5, 2017.

(51) Int. Cl.
*H04N 5/33* (2006.01)
*H04N 5/235* (2006.01)
(Continued)

(52) U.S. Cl.
CPC ......... *H04N 5/23229* (2013.01); *H04N 1/484* (2013.01); *H04N 5/2354* (2013.01);
(Continued)

(58) Field of Classification Search
CPC .... H04N 5/23229; H04N 5/2354; H04N 9/43; H04N 9/045; H04N 1/484; H04N 5/332; H04N 5/2256
See application file for complete search history.

(56) References Cited

U.S. PATENT DOCUMENTS 6,081,612 A   6/2000  Gutkowicz-Krusin et al.
6,151,424 A   11/2000  Hsu
(Continued)

FOREIGN PATENT DOCUMENTS

WO    2013/163789 A1   11/2013

OTHER PUBLICATIONS

Examiner initiated interview summary (PTOL-413B) dated Dec. 4, 2019 for U.S. Appl. No. 15/725,753.
(Continued)

*Primary Examiner* — Hung H Lam
(74) *Attorney, Agent, or Firm* — Alston & Bird LLP

(57) ABSTRACT

A method is provided for constructing a composite image. The method comprises illuminating an object with light of a particular spectral band, capturing a digital image of the illuminated object using a monochromatic image sensor of an imaging device to obtain a monochrome image, repeating the steps of illuminating and capturing to obtain a plurality of monochrome images of the object illuminated by light of a plurality of different spectral bands, processing the plurality of monochrome images to generate image data for one or more output channels, and generating a color composite image from the image data. The color composite image comprises the one or more output channels.

19 Claims, 5 Drawing Sheets

(51) Int. Cl.
  *H04N 5/232* (2006.01)
  *H04N 9/43* (2006.01)
  *H04N 9/04* (2006.01)
  *H04N 1/48* (2006.01)
  *H04N 5/225* (2006.01)

(52) U.S. Cl.
  CPC ............ *H04N 5/332* (2013.01); *H04N 9/045* (2013.01); *H04N 9/43* (2013.01); *H04N 5/2256* (2013.01)

(56) References Cited

U.S. PATENT DOCUMENTS

| | | | |
|---|---|---|---|
| 6,832,725 B2 | 12/2004 | Gardiner et al. |
| 7,128,266 B2 | 10/2006 | Zhu et al. |
| 7,159,783 B2 | 1/2007 | Walczyk et al. |
| 7,413,127 B2 | 8/2008 | Ehrhart et al. |
| 7,726,575 B2 | 6/2010 | Wang et al. |
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Van et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van et al. |
| 8,556,177 B2 | 10/2013 | Hussey et al. |
| 8,556,180 B2 | 10/2013 | Liou |
| 8,559,767 B2 | 10/2013 | Barber et al. |
| 8,561,895 B2 | 10/2013 | Gomez et al. |
| 8,561,903 B2 | 10/2013 | Sauerwein, Jr. |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,038 B2 | 3/2014 | Blair |
| 8,682,077 B1 | 3/2014 | Longacre, Jr. |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz, Sr. |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue et al. |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein, Jr. |
| 8,880,426 B2 | 11/2014 | Smith |
| 8,881,983 B2 | 11/2014 | Havens et al. |

(56) References Cited

U.S. PATENT DOCUMENTS

| | | |
|---|---|---|
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | El et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber et al. |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,061,527 B2 | 6/2015 | Tobin et al. |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,076,459 B2 | 7/2015 | Braho et al. |
| 9,079,423 B2 | 7/2015 | Bouverie et al. |
| 9,080,856 B2 | 7/2015 | Laffargue |
| 9,082,023 B2 | 7/2015 | Feng et al. |
| 9,082,031 B2 | 7/2015 | Liu et al. |
| 9,084,032 B2 | 7/2015 | Rautiola et al. |
| 9,087,250 B2 | 7/2015 | Coyle |
| 9,092,681 B2 | 7/2015 | Havens et al. |
| 9,092,682 B2 | 7/2015 | Wilz, Sr. et al. |
| 9,092,683 B2 | 7/2015 | Koziol et al. |
| 9,093,141 B2 | 7/2015 | Liu |
| D737,321 S | 8/2015 | Lee |
| 9,098,763 B2 | 8/2015 | Lu et al. |
| 9,104,929 B2 | 8/2015 | Todeschini |
| 9,104,934 B2 | 8/2015 | Li et al. |
| 9,107,484 B2 | 8/2015 | Chaney |
| 9,111,159 B2 | 8/2015 | Liu et al. |
| 9,111,166 B2 | 8/2015 | Cunningham, IV |
| 9,135,483 B2 | 9/2015 | Liu et al. |
| 9,137,009 B1 | 9/2015 | Gardiner |
| 9,141,839 B2 | 9/2015 | Xian et al. |
| 9,147,096 B2 | 9/2015 | Wang |
| 9,148,474 B2 | 9/2015 | Skvoretz |
| 9,158,000 B2 | 10/2015 | Sauerwein, Jr. |
| 9,158,340 B2 | 10/2015 | Reed et al. |
| 9,158,953 B2 | 10/2015 | Gillet et al. |
| 9,159,059 B2 | 10/2015 | Daddabbo et al. |
| 9,165,174 B2 | 10/2015 | Huck |
| 9,171,543 B2 | 10/2015 | Emerick et al. |
| 9,183,425 B2 | 11/2015 | Wang |
| 9,189,669 B2 | 11/2015 | Zhu et al. |
| 9,195,844 B2 | 11/2015 | Todeschini et al. |
| 9,202,458 B2 | 12/2015 | Braho et al. |
| 9,208,366 B2 | 12/2015 | Liu |
| 9,208,367 B2 | 12/2015 | Smith |
| 9,219,836 B2 | 12/2015 | Bouverie et al. |
| 9,224,022 B2 | 12/2015 | Ackley et al. |
| 9,224,024 B2 | 12/2015 | Bremer et al. |
| 9,224,027 B2 | 12/2015 | Van et al. |
| D747,321 S | 1/2016 | London et al. |
| 9,230,140 B1 | 1/2016 | Ackley |
| 9,235,553 B2 | 1/2016 | Fitch et al. |
| 9,239,950 B2 | 1/2016 | Fletcher |
| 9,245,492 B2 | 1/2016 | Ackley et al. |
| 9,248,640 B2 | 2/2016 | Heng |
| 9,250,652 B2 | 2/2016 | London et al. |
| 9,250,712 B1 | 2/2016 | Todeschini |
| 9,251,411 B2 | 2/2016 | Todeschini |
| 9,258,033 B2 | 2/2016 | Showering |
| 9,262,633 B1 | 2/2016 | Todeschini et al. |
| 9,262,660 B2 | 2/2016 | Lu et al. |
| 9,262,662 B2 | 2/2016 | Chen et al. |
| 9,269,036 B2 | 2/2016 | Bremer |
| 9,270,782 B2 | 2/2016 | Hala et al. |
| 9,274,812 B2 | 3/2016 | Doren et al. |
| 9,275,388 B2 | 3/2016 | Havens et al. |
| 9,277,668 B2 | 3/2016 | Feng et al. |
| 9,280,693 B2 | 3/2016 | Feng et al. |
| 9,286,496 B2 | 3/2016 | Smith |
| 9,297,900 B2 | 3/2016 | Jiang |
| 9,298,964 B2 | 3/2016 | Li et al. |
| 9,301,427 B2 | 3/2016 | Feng et al. |
| D754,205 S | 4/2016 | Nguyen et al. |
| D754,206 S | 4/2016 | Nguyen et al. |
| 9,304,376 B2 | 4/2016 | Anderson |
| 9,310,609 B2 | 4/2016 | Rueblinger et al. |
| 9,313,377 B2 | 4/2016 | Todeschini et al. |
| 9,317,037 B2 | 4/2016 | Byford et al. |
| 9,319,548 B2 | 4/2016 | Showering et al. |
| D757,009 S | 5/2016 | Oberpriller et al. |
| 9,342,723 B2 | 5/2016 | Liu et al. |
| 9,342,724 B2 | 5/2016 | McCloskey et al. |
| 9,360,304 B2 | 6/2016 | Xue et al. |
| 9,361,882 B2 | 6/2016 | Ressler et al. |
| 9,365,381 B2 | 6/2016 | Colonel et al. |
| 9,373,018 B2 | 6/2016 | Colavito et al. |
| 9,375,945 B1 | 6/2016 | Bowles |
| 9,378,403 B2 | 6/2016 | Wang et al. |
| D760,719 S | 7/2016 | Zhou et al. |
| 9,383,848 B2 | 7/2016 | Daghigh |
| 9,384,374 B2 | 7/2016 | Bianconi |

(56) References Cited

U.S. PATENT DOCUMENTS

| | | | |
|---|---|---|---|
| 9,390,304 B2 | 7/2016 | Chang et al. | |
| 9,390,596 B1 | 7/2016 | Todeschini | |
| D762,604 S | 8/2016 | Fitch et al. | |
| 9,411,386 B2 | 8/2016 | Sauerwein, Jr. | |
| 9,412,242 B2 | 8/2016 | Van et al. | |
| 9,418,269 B2 | 8/2016 | Havens et al. | |
| 9,418,270 B2 | 8/2016 | Van et al. | |
| 9,423,318 B2 | 8/2016 | Liu et al. | |
| 9,424,454 B2 | 8/2016 | Tao et al. | |
| D766,244 S | 9/2016 | Zhou et al. | |
| 9,436,860 B2 | 9/2016 | Smith et al. | |
| 9,443,123 B2 | 9/2016 | Hejl | |
| 9,443,222 B2 | 9/2016 | Singel et al. | |
| 9,454,689 B2 | 9/2016 | McCloskey et al. | |
| 9,464,885 B2 | 10/2016 | Lloyd et al. | |
| 9,465,967 B2 | 10/2016 | Xian et al. | |
| 9,478,113 B2 | 10/2016 | Xie et al. | |
| 9,478,983 B2 | 10/2016 | Kather et al. | |
| D771,631 S | 11/2016 | Fitch et al. | |
| 9,481,186 B2 | 11/2016 | Bouverie et al. | |
| 9,487,113 B2 | 11/2016 | Schukalski | |
| 9,488,986 B1 | 11/2016 | Solanki | |
| 9,489,782 B2 | 11/2016 | Payne et al. | |
| 9,490,540 B1 | 11/2016 | Davies et al. | |
| 9,491,729 B2 | 11/2016 | Rautiola et al. | |
| 9,497,092 B2 | 11/2016 | Gomez et al. | |
| 9,507,974 B1 | 11/2016 | Todeschini | |
| 9,519,814 B2 | 12/2016 | Cudzilo | |
| 9,521,331 B2 | 12/2016 | Bessettes et al. | |
| 9,530,038 B2 | 12/2016 | Xian et al. | |
| D777,166 S | 1/2017 | Bidwell et al. | |
| 9,558,386 B2 | 1/2017 | Yeakley | |
| 9,572,901 B2 | 2/2017 | Todeschini | |
| 9,606,581 B1 | 3/2017 | Howe et al. | |
| D783,601 S | 4/2017 | Schulte et al. | |
| D785,617 S | 5/2017 | Bidwell et al. | |
| D785,636 S | 5/2017 | Oberpriller et al. | |
| 9,646,189 B2 | 5/2017 | Lu et al. | |
| 9,646,191 B2 | 5/2017 | Unemyr et al. | |
| 9,652,648 B2 | 5/2017 | Ackley et al. | |
| 9,652,653 B2 | 5/2017 | Todeschini et al. | |
| 9,656,487 B2 | 5/2017 | Ho et al. | |
| 9,659,198 B2 | 5/2017 | Giordano et al. | |
| D790,505 S | 6/2017 | Vargo et al. | |
| D790,546 S | 6/2017 | Zhou et al. | |
| 9,680,282 B2 | 6/2017 | Hanenburg | |
| 9,697,401 B2 | 7/2017 | Feng et al. | |
| 9,701,140 B1 | 7/2017 | Alaganchetty et al. | |
| 9,894,298 B1 * | 2/2018 | Solh | H04N 5/23293 |
| 10,110,805 B2 | 10/2018 | Pomerantz et al. | |
| 10,325,436 B2 | 6/2019 | Van et al. | |
| 2005/0111694 A1 | 5/2005 | Loce et al. | |
| 2007/0063048 A1 | 3/2007 | Havens et al. | |
| 2008/0185432 A1 | 8/2008 | Caballero et al. | |
| 2009/0134221 A1 | 5/2009 | Zhu et al. | |
| 2010/0177076 A1 | 7/2010 | Essinger et al. | |
| 2010/0177080 A1 | 7/2010 | Essinger et al. | |
| 2010/0177707 A1 | 7/2010 | Essinger et al. | |
| 2010/0177749 A1 | 7/2010 | Essinger et al. | |
| 2010/0265880 A1 | 10/2010 | Rautiola et al. | |
| 2011/0169999 A1 | 7/2011 | Grunow et al. | |
| 2011/0202554 A1 | 8/2011 | Powilleit et al. | |
| 2012/0111946 A1 | 5/2012 | Golant | |
| 2012/0168511 A1 | 7/2012 | Kotlarsky et al. | |
| 2012/0168512 A1 | 7/2012 | Kotlarsky et al. | |
| 2012/0193423 A1 | 8/2012 | Samek | |
| 2012/0194692 A1 | 8/2012 | Mers et al. | |
| 2012/0203647 A1 | 8/2012 | Smith | |
| 2012/0223141 A1 | 9/2012 | Good et al. | |
| 2012/0228382 A1 | 9/2012 | Havens et al. | |
| 2012/0248188 A1 | 10/2012 | Kearney | |
| 2013/0043312 A1 | 2/2013 | Van Horn | |
| 2013/0075168 A1 | 3/2013 | Amundsen et al. | |
| 2013/0082104 A1 | 4/2013 | Kearney et al. | |
| 2013/0175341 A1 | 7/2013 | Kearney et al. | |
| 2013/0175343 A1 | 7/2013 | Good | |
| 2013/0257744 A1 | 10/2013 | Daghigh et al. | |
| 2013/0257759 A1 | 10/2013 | Daghigh | |
| 2013/0270346 A1 | 10/2013 | Xian et al. | |
| 2013/0292475 A1 | 11/2013 | Kotlarsky et al. | |
| 2013/0292477 A1 | 11/2013 | Hennick et al. | |
| 2013/0293539 A1 | 11/2013 | Hunt et al. | |
| 2013/0293540 A1 | 11/2013 | Laffargue et al. | |
| 2013/0306728 A1 | 11/2013 | Thuries et al. | |
| 2013/0306731 A1 | 11/2013 | Pedrao | |
| 2013/0307964 A1 | 11/2013 | Bremer et al. | |
| 2013/0308625 A1 | 11/2013 | Park et al. | |
| 2013/0313324 A1 | 11/2013 | Koziol et al. | |
| 2013/0332524 A1 | 12/2013 | Fiala et al. | |
| 2013/0332996 A1 | 12/2013 | Fiala et al. | |
| 2014/0001267 A1 | 1/2014 | Giordano et al. | |
| 2014/0002828 A1 | 1/2014 | Laffargue et al. | |
| 2014/0025584 A1 | 1/2014 | Liu et al. | |
| 2014/0034734 A1 | 2/2014 | Sauerwein, Jr. | |
| 2014/0036229 A1 | 2/2014 | Hsu | |
| 2014/0036848 A1 | 2/2014 | Pease et al. | |
| 2014/0037196 A1 | 2/2014 | Blair | |
| 2014/0039693 A1 | 2/2014 | Havens et al. | |
| 2014/0049120 A1 | 2/2014 | Kohtz et al. | |
| 2014/0049635 A1 | 2/2014 | Laffargue et al. | |
| 2014/0061306 A1 | 3/2014 | Wu et al. | |
| 2014/0063289 A1 | 3/2014 | Hussey et al. | |
| 2014/0066136 A1 | 3/2014 | Sauerwein et al. | |
| 2014/0067692 A1 | 3/2014 | Ye et al. | |
| 2014/0070005 A1 | 3/2014 | Nahill et al. | |
| 2014/0071840 A1 | 3/2014 | Venancio | |
| 2014/0074746 A1 | 3/2014 | Wang | |
| 2014/0076974 A1 | 3/2014 | Havens et al. | |
| 2014/0078342 A1 | 3/2014 | Li et al. | |
| 2014/0097249 A1 | 4/2014 | Gomez et al. | |
| 2014/0098792 A1 | 4/2014 | Wang et al. | |
| 2014/0100774 A1 | 4/2014 | Showering | |
| 2014/0100813 A1 | 4/2014 | Showering | |
| 2014/0103115 A1 | 4/2014 | Meier et al. | |
| 2014/0104413 A1 | 4/2014 | McCloskey et al. | |
| 2014/0104414 A1 | 4/2014 | McCloskey et al. | |
| 2014/0104416 A1 | 4/2014 | Giordano et al. | |
| 2014/0106725 A1 | 4/2014 | Sauerwein, Jr. | |
| 2014/0108010 A1 | 4/2014 | Maltseff et al. | |
| 2014/0108402 A1 | 4/2014 | Gomez et al. | |
| 2014/0108682 A1 | 4/2014 | Caballero | |
| 2014/0110485 A1 | 4/2014 | Toa et al. | |
| 2014/0114530 A1 | 4/2014 | Fitch et al. | |
| 2014/0125853 A1 | 5/2014 | Wang | |
| 2014/0125999 A1 | 5/2014 | Longacre et al. | |
| 2014/0129378 A1 | 5/2014 | Richardson | |
| 2014/0131443 A1 | 5/2014 | Smith | |
| 2014/0131444 A1 | 5/2014 | Wang | |
| 2014/0133379 A1 | 5/2014 | Wang et al. | |
| 2014/0136208 A1 | 5/2014 | Maltseff et al. | |
| 2014/0140585 A1 | 5/2014 | Wang | |
| 2014/0152882 A1 | 6/2014 | Samek et al. | |
| 2014/0158770 A1 | 6/2014 | Sevier et al. | |
| 2014/0159869 A1 | 6/2014 | Zumsteg et al. | |
| 2014/0166755 A1 | 6/2014 | Liu et al. | |
| 2014/0166757 A1 | 6/2014 | Smith | |
| 2014/0166759 A1 | 6/2014 | Liu et al. | |
| 2014/0168787 A1 | 6/2014 | Wang et al. | |
| 2014/0175165 A1 | 6/2014 | Havens et al. | |
| 2014/0191684 A1 | 7/2014 | Valois | |
| 2014/0191913 A1 | 7/2014 | Ge et al. | |
| 2014/0197239 A1 | 7/2014 | Havens et al. | |
| 2014/0197304 A1 | 7/2014 | Feng et al. | |
| 2014/0204268 A1 | 7/2014 | Grunow et al. | |
| 2014/0214631 A1 | 7/2014 | Hansen | |
| 2014/0217166 A1 | 8/2014 | Berthiaume et al. | |
| 2014/0217180 A1 | 8/2014 | Liu | |
| 2014/0225926 A1 * | 8/2014 | Mathers | G09G 5/028 345/634 |
| 2014/0231500 A1 | 8/2014 | Ehrhart et al. | |
| 2014/0247315 A1 | 9/2014 | Marty et al. | |
| 2014/0253686 A1 | 9/2014 | Wong et al. | |
| 2014/0263493 A1 | 9/2014 | Amurgis et al. | |
| 2014/0263645 A1 | 9/2014 | Smith et al. | |

(56) References Cited

U.S. PATENT DOCUMENTS

| | | |
|---|---|---|
| 2014/0270196 A1 | 9/2014 | Braho et al. |
| 2014/0270229 A1 | 9/2014 | Braho |
| 2014/0278387 A1 | 9/2014 | Digregorio |
| 2014/0282210 A1 | 9/2014 | Bianconi |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0332590 A1 | 11/2014 | Wang et al. |
| 2014/0351317 A1 | 11/2014 | Smith et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0009338 A1 | 1/2015 | Laffargue et al. |
| 2015/0014416 A1 | 1/2015 | Kotlarsky et al. |
| 2015/0021397 A1 | 1/2015 | Rueblinger et al. |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0039878 A1 | 2/2015 | Barten |
| 2015/0040378 A1 | 2/2015 | Saber et al. |
| 2015/0049347 A1 | 2/2015 | Laffargue et al. |
| 2015/0051992 A1 | 2/2015 | Smith |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0088522 A1 | 3/2015 | Hendrickson et al. |
| 2015/0096872 A1 | 4/2015 | Woodburn |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0149946 A1 | 5/2015 | Benos et al. |
| 2015/0161429 A1 | 6/2015 | Xian |
| 2015/0178523 A1 | 6/2015 | Gelay et al. |
| 2015/0178537 A1 | 6/2015 | El et al. |
| 2015/0178685 A1 | 6/2015 | Krumel et al. |
| 2015/0181109 A1 | 6/2015 | Gillet et al. |
| 2015/0186703 A1 | 7/2015 | Chen et al. |
| 2015/0199957 A1 | 7/2015 | Funyak et al. |
| 2015/0210199 A1 | 7/2015 | Payne |
| 2015/0212565 A1 | 7/2015 | Murawski et al. |
| 2015/0213647 A1 | 7/2015 | Laffargue et al. |
| 2015/0220753 A1 | 8/2015 | Zhu et al. |
| 2015/0220901 A1 | 8/2015 | Gomez et al. |
| 2015/0227189 A1 | 8/2015 | Davis et al. |
| 2015/0236984 A1 | 8/2015 | Sevier |
| 2015/0239348 A1 | 8/2015 | Chamberlin |
| 2015/0242658 A1 | 8/2015 | Nahill et al. |
| 2015/0248572 A1 | 9/2015 | Soule et al. |
| 2015/0254485 A1 | 9/2015 | Feng et al. |
| 2015/0261643 A1 | 9/2015 | Caballero et al. |
| 2015/0264624 A1 | 9/2015 | Wang et al. |
| 2015/0268971 A1 | 9/2015 | Barten |
| 2015/0269402 A1 | 9/2015 | Barber et al. |
| 2015/0288689 A1 | 10/2015 | Todeschini et al. |
| 2015/0288896 A1 | 10/2015 | Wang |
| 2015/0310243 A1 | 10/2015 | Ackley et al. |
| 2015/0310244 A1 | 10/2015 | Xian et al. |
| 2015/0310389 A1 | 10/2015 | Crimm et al. |
| 2015/0312780 A1 | 10/2015 | Wang et al. |
| 2015/0327012 A1 | 11/2015 | Bian et al. |
| 2016/0014251 A1 | 1/2016 | Hejl |
| 2016/0025697 A1 | 1/2016 | Alt et al. |
| 2016/0026838 A1 | 1/2016 | Gillet et al. |
| 2016/0026839 A1 | 1/2016 | Qu et al. |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0062473 A1 | 3/2016 | Bouchat et al. |
| 2016/0070944 A1 | 3/2016 | McCloskey et al. |
| 2016/0092805 A1 | 3/2016 | Geisler et al. |
| 2016/0101936 A1 | 4/2016 | Chamberlin |
| 2016/0102975 A1 | 4/2016 | McCloskey et al. |
| 2016/0104019 A1 | 4/2016 | Todeschini et al. |
| 2016/0104274 A1 | 4/2016 | Jovanovski et al. |
| 2016/0109219 A1 | 4/2016 | Ackley et al. |
| 2016/0109220 A1 | 4/2016 | Laffargue et al. |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0117627 A1 | 4/2016 | Raj et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0125873 A1 | 5/2016 | Braho et al. |
| 2016/0133253 A1 | 5/2016 | Braho et al. |
| 2016/0171597 A1 | 6/2016 | Todeschini |
| 2016/0171666 A1 | 6/2016 | McCloskey |
| 2016/0171720 A1 | 6/2016 | Todeschini |
| 2016/0171775 A1 | 6/2016 | Todeschini et al. |
| 2016/0171777 A1 | 6/2016 | Todeschini et al. |
| 2016/0174674 A1 | 6/2016 | Oberpriller et al. |
| 2016/0178479 A1 | 6/2016 | Goldsmith |
| 2016/0178685 A1 | 6/2016 | Young et al. |
| 2016/0178707 A1 | 6/2016 | Young et al. |
| 2016/0179132 A1 | 6/2016 | Harr |
| 2016/0179143 A1 | 6/2016 | Bidwell et al. |
| 2016/0179368 A1 | 6/2016 | Roeder |
| 2016/0179378 A1 | 6/2016 | Kent et al. |
| 2016/0180130 A1 | 6/2016 | Bremer |
| 2016/0180133 A1 | 6/2016 | Oberpriller et al. |
| 2016/0180136 A1 | 6/2016 | Meier et al. |
| 2016/0180594 A1 | 6/2016 | Todeschini |
| 2016/0180663 A1 | 6/2016 | McMahan et al. |
| 2016/0180678 A1 | 6/2016 | Ackley et al. |
| 2016/0180713 A1 | 6/2016 | Bernhardt et al. |
| 2016/0185136 A1 | 6/2016 | Ng et al. |
| 2016/0185291 A1 | 6/2016 | Chamberlin |
| 2016/0186926 A1 | 6/2016 | Oberpriller et al. |
| 2016/0188861 A1 | 6/2016 | Todeschini |
| 2016/0188939 A1 | 6/2016 | Sailors et al. |
| 2016/0188940 A1 | 6/2016 | Lu et al. |
| 2016/0188941 A1 | 6/2016 | Todeschini et al. |
| 2016/0188942 A1 | 6/2016 | Good et al. |
| 2016/0188943 A1 | 6/2016 | Franz |
| 2016/0188944 A1 | 6/2016 | Wilz et al. |
| 2016/0189076 A1 | 6/2016 | Mellott et al. |
| 2016/0189087 A1 | 6/2016 | Morton et al. |
| 2016/0189088 A1 | 6/2016 | Pecorari et al. |
| 2016/0189092 A1 | 6/2016 | George et al. |
| 2016/0189284 A1 | 6/2016 | Mellott et al. |
| 2016/0189288 A1 | 6/2016 | Todeschini et al. |
| 2016/0189366 A1 | 6/2016 | Chamberlin et al. |
| 2016/0189443 A1 | 6/2016 | Smith |
| 2016/0189447 A1 | 6/2016 | Valenzuela |
| 2016/0189489 A1 | 6/2016 | Au et al. |
| 2016/0191684 A1 | 6/2016 | Dipiazza et al. |
| 2016/0192051 A1 | 6/2016 | Dipiazza et al. |
| 2016/0202951 A1 | 7/2016 | Pike et al. |
| 2016/0202958 A1 | 7/2016 | Zabel et al. |
| 2016/0202959 A1 | 7/2016 | Doubleday et al. |
| 2016/0203021 A1 | 7/2016 | Pike et al. |
| 2016/0203429 A1 | 7/2016 | Mellott et al. |
| 2016/0203797 A1 | 7/2016 | Pike et al. |
| 2016/0203820 A1 | 7/2016 | Zabel et al. |
| 2016/0204623 A1 | 7/2016 | Haggerty et al. |
| 2016/0204636 A1 | 7/2016 | Allen et al. |
| 2016/0204638 A1 | 7/2016 | Miraglia et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |

(56) References Cited

U.S. PATENT DOCUMENTS

| | | |
|---|---|---|
| 2016/0306769 A1 | 10/2016 | Kohtz et al. |
| 2016/0314276 A1 | 10/2016 | Wilz et al. |
| 2016/0314294 A1 | 10/2016 | Kubler et al. |
| 2016/0316190 A1 | 10/2016 | McCloskey et al. |
| 2016/0323310 A1 | 11/2016 | Todeschini et al. |
| 2016/0325677 A1 | 11/2016 | Fitch et al. |
| 2016/0327614 A1 | 11/2016 | Young et al. |
| 2016/0327930 A1 | 11/2016 | Charpentier et al. |
| 2016/0328762 A1 | 11/2016 | Pape |
| 2016/0330218 A1 | 11/2016 | Hussey et al. |
| 2016/0343163 A1 | 11/2016 | Venkatesha et al. |
| 2016/0343176 A1 | 11/2016 | Ackley |
| 2016/0364914 A1 | 12/2016 | Todeschini |
| 2016/0370220 A1 | 12/2016 | Ackley et al. |
| 2016/0372282 A1 | 12/2016 | Bandringa |
| 2016/0373847 A1 | 12/2016 | Vargo et al. |
| 2016/0377414 A1 | 12/2016 | Thuries et al. |
| 2016/0377417 A1 | 12/2016 | Jovanovski et al. |
| 2017/0010141 A1 | 1/2017 | Ackley |
| 2017/0010328 A1 | 1/2017 | Mullen et al. |
| 2017/0010780 A1 | 1/2017 | Waldron et al. |
| 2017/0016714 A1 | 1/2017 | Laffargue et al. |
| 2017/0018094 A1 | 1/2017 | Todeschini |
| 2017/0046603 A1 | 2/2017 | Lee et al. |
| 2017/0047864 A1 | 2/2017 | Stang et al. |
| 2017/0053146 A1 | 2/2017 | Liu et al. |
| 2017/0053147 A1 | 2/2017 | Germaine et al. |
| 2017/0053647 A1 | 2/2017 | Nichols et al. |
| 2017/0055606 A1 | 3/2017 | Xu et al. |
| 2017/0060316 A1 | 3/2017 | Larson |
| 2017/0061961 A1 | 3/2017 | Nichols et al. |
| 2017/0064634 A1 | 3/2017 | Van et al. |
| 2017/0083730 A1 | 3/2017 | Feng et al. |
| 2017/0091502 A1 | 3/2017 | Furlong et al. |
| 2017/0091706 A1 | 3/2017 | Lloyd et al. |
| 2017/0091741 A1 | 3/2017 | Todeschini |
| 2017/0091904 A1 | 3/2017 | Ventress, Jr. |
| 2017/0092908 A1 | 3/2017 | Chaney |
| 2017/0094238 A1 | 3/2017 | Germaine et al. |
| 2017/0098947 A1 | 4/2017 | Wolski |
| 2017/0100949 A1 | 4/2017 | Celinder et al. |
| 2017/0108838 A1 | 4/2017 | Todeschini et al. |
| 2017/0108895 A1 | 4/2017 | Chamberlin et al. |
| 2017/0118355 A1 | 4/2017 | Wong et al. |
| 2017/0123598 A1 | 5/2017 | Phan et al. |
| 2017/0124369 A1 | 5/2017 | Rueblinger et al. |
| 2017/0124396 A1 | 5/2017 | Todeschini et al. |
| 2017/0124687 A1 | 5/2017 | McCloskey et al. |
| 2017/0126873 A1 | 5/2017 | McGary et al. |
| 2017/0126904 A1 | 5/2017 | D'Armancourt et al. |
| 2017/0139012 A1 | 5/2017 | Smith |
| 2017/0140329 A1 | 5/2017 | Bernhardt et al. |
| 2017/0140731 A1 | 5/2017 | Smith |
| 2017/0147847 A1 | 5/2017 | Berggren et al. |
| 2017/0150124 A1 | 5/2017 | Thuries |
| 2017/0169198 A1 | 6/2017 | Nichols |
| 2017/0171035 A1 | 6/2017 | Lu et al. |
| 2017/0171703 A1 | 6/2017 | Maheswaranathan |
| 2017/0171803 A1 | 6/2017 | Maheswaranathan |
| 2017/0180359 A1 | 6/2017 | Wolski et al. |
| 2017/0180577 A1 | 6/2017 | Nguon et al. |
| 2017/0181299 A1 | 6/2017 | Shi et al. |
| 2017/0190192 A1 | 7/2017 | Delario et al. |
| 2017/0193432 A1 | 7/2017 | Bernhardt |
| 2017/0193461 A1 | 7/2017 | Celinder et al. |
| 2017/0193727 A1 | 7/2017 | Van et al. |
| 2017/0199266 A1 | 7/2017 | Rice et al. |
| 2017/0200108 A1 | 7/2017 | Au et al. |
| 2017/0200275 A1 | 7/2017 | McCloskey et al. |
| 2018/0025529 A1 | 1/2018 | Wu et al. |

OTHER PUBLICATIONS

Non-Final Rejection dated May 2, 2019 for U.S. Appl. No. 15/725,753.

Notice of Allowance and Fees Due (PTOL-85) dated Dec. 4, 2019 for U.S. Appl. No. 15/725,753.

Notice of Allowance and Fees Due (PTOL-85) dated Mar. 19, 2020 for U.S. Appl. No. 15/725,753.

Requirement for Restriction/Election dated Dec. 13, 2018 for U.S. Appl. No. 15/725,753.

Notice of Allowance and Fees Due (PTOL-85) dated Apr. 15, 2020 for U.S. Appl. No. 15/725,753.

* cited by examiner

METHODS FOR CONSTRUCTING A COLOR COMPOSITE IMAGE

FIELD OF THE INVENTION

The present invention relates to digital imaging and more specifically, to methods for constructing a color composite image.

BACKGROUND

Generally speaking, digital imaging devices fall into one of two categories: monochromatic imaging devices and color imaging devices. Monochromatic imaging devices employ a single (broad or narrow) spectral illumination band paired with a monochromatic image sensor (i.e., an image sensor that does not use multiple colored, spatially separate red-green-blue (RGB) filters) for capturing black and white images. Color imaging devices employ a single broad visible spectral band paired with a color-filtered image sensor for capturing color images using a RGB (red-green-blue) filter pattern. The three output channels (RGB) of the color images are displayed on an industry standard RGB monitor. Monochromatic image sensors however offer better performance in the way of higher sensitivity and better resolution relative to color image sensors. For example, barcode scanners using color image sensors may suffer drawbacks in performance.

Therefore, a need exists for methods for constructing color composite images using a monochromatic image sensor. A further need exists for constructing color composite images with higher sensitivity and better resolution.

SUMMARY

Accordingly, in one aspect, the present invention embraces a method for constructing a composite image. The method comprises illuminating an object with light of a particular spectral band, capturing a digital image of the illuminated object using a monochromatic image sensor of an imaging device to obtain a monochrome image, repeating the steps of illuminating and capturing to obtain a plurality of monochrome images of the object illuminated by light of a plurality of different spectral bands, processing the plurality of monochrome images to generate image data for one or more output channels, and generating a color composite image from the image data. The color composite image comprises the one or more output channels.

In another aspect, the present invention embraces a method for constructing a color composite image. The method comprises capturing a plurality of digital monochrome images with a monochromatic image sensor, processing the plurality of digital monochrome images to generate image data for one or more output channels, and generating the color composite image from the image data. Each digital monochrome image in the plurality of digital monochrome images is illuminated with a different spectral band. The color composite image comprises the one or more output channels.

The foregoing illustrative summary, as well as other exemplary objectives and/or advantages of the present invention, and the manner in which the same are accomplished, are further explained within the following detailed description and its accompanying drawings.

DETAILED DESCRIPTION

The present invention embraces methods for constructing a color composite image. Various embodiments provide different ways of combining different color channels to view different sources of image data across the electromagnetic spectrum.

As used herein, the term "true-color composite image" approximates the range of vision for the human eye, and hence a "true-color composite image" appears to be close to what one would expect to see in a normal photograph. A "false color composite image" is an image that uses visible colors to represent portions of the electromagnetic spectrum outside the typical range of vision, allowing the image to provide data that is otherwise invisible to the naked eye. A "composite image" is a combined image made up of more than one constituent image. False color images may be used to enhance, contrast, or distinguish details. In contrast to a true color image, a false color image sacrifices natural color rendition to ease the detection of features that are not readily discernible otherwise, for example, the use of near infrared for the detection of vegetation in images. While a false color image can be created using solely the visible spectrum, some or all image data used may be from electromagnetic radiation (EM) outside the visible spectrum (e.g., infrared or ultraviolet). The choice of spectral bands is governed by the physical properties of the object under investigation. As the human eyes uses three spectral bands, three spectral bands are commonly combined into a false color image. At least two spectral bands are needed for a false color encoding, and it is possible to combine more bands into the three visual RGB bands, with the eye's ability to discern three channels being the limiting factor. For a true color image, the red, green, and blue (RGB) spectral bands from the camera are mapped to the corresponding RGB channels of the image, yielding a RGB TO RGB mapping. For the false color image, this relationship is changed. The simplest false color encoding is to take an RGB image in the visible spectrum, but map it differently, e.g., GBR TO RGB. With a false color composite image, at least one of the red, green, and blue channels is supplemented by data that does not correspond to its originally intended color band (for example [R,G, B]=[IR,G,UV]).

Figure 1:
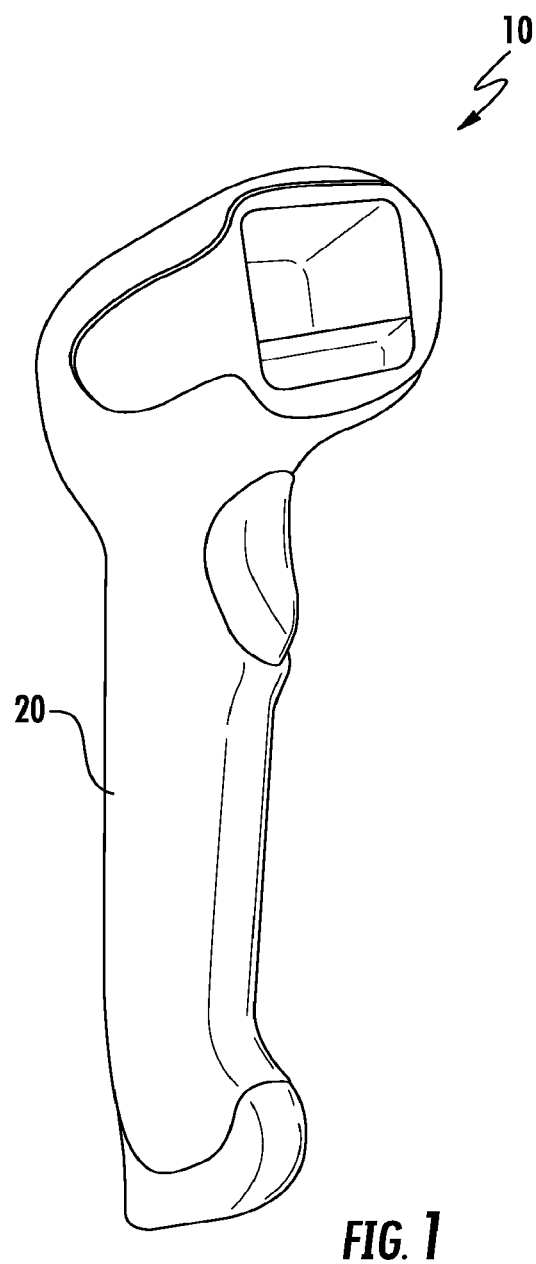
FIG. 1 graphically depicts an exemplary imaging device for performing the steps of a method for constructing a color composite image, according to various embodiments of the present invention.

Referring now to FIG. 1, an imaging device 10 is depicted. The imaging device 10 may be a single, hand-held device such as the hand-held imaging device depicted in FIG. 1. In various embodiments, the imaging device 10 is not handheld, but rather integrated with a supermarket slot scanner or fixedly mounted options on a counter top or as an overhead document imager, etc. The imaging device 10 may include a trigger 34 as interface circuitry 57. Activating the trigger 34 (e.g., by pushing a button, touching a specific area on the imaging device 10 (i.e., handheld imager)) initiates the imaging device 10 to capture images. Additional components may be included as interface circuitry 57 of FIG. 2 (e.g., indicator LEDs, etc.)

Figure 2:
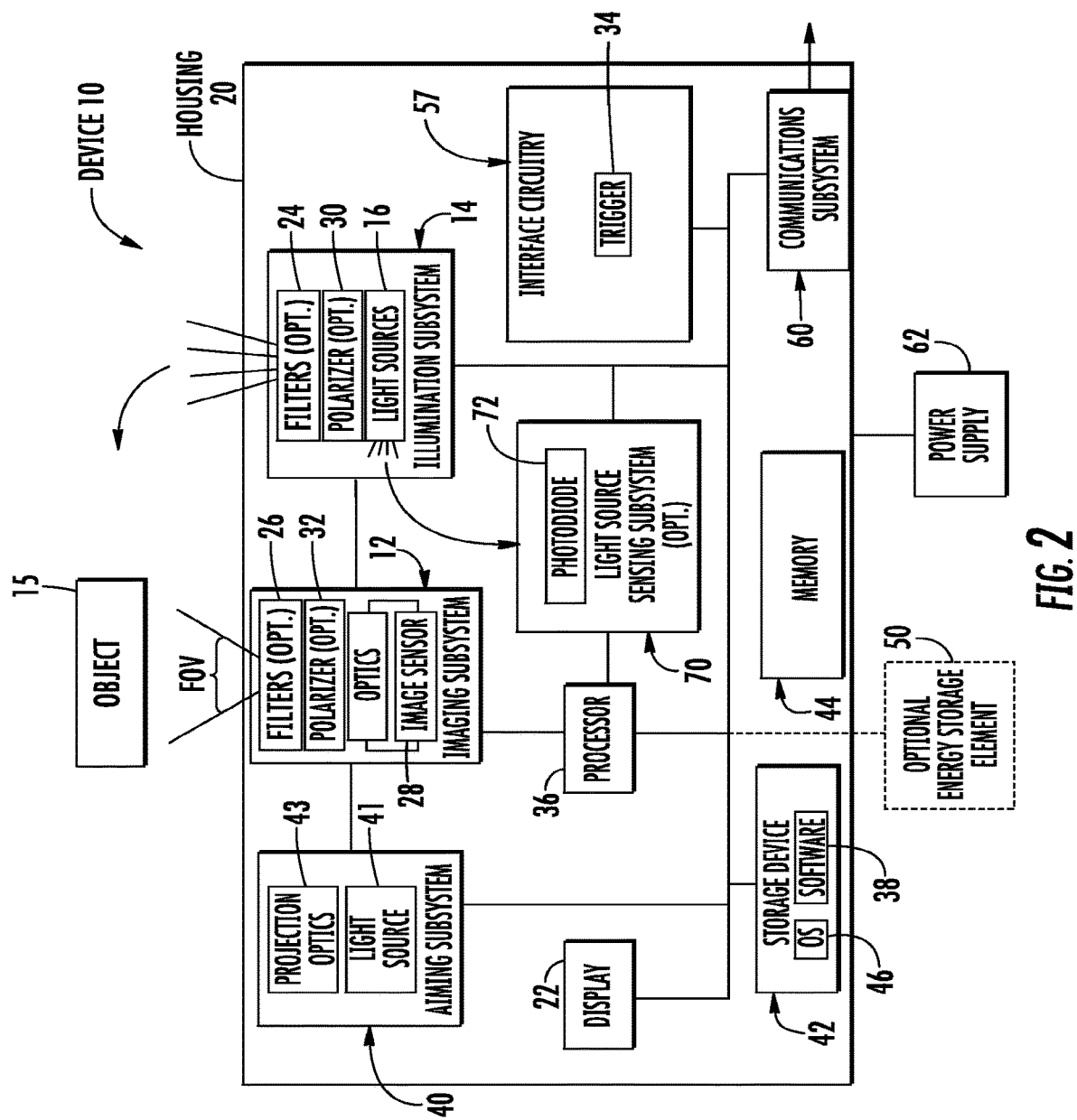
FIG. 2 is a schematic block diagram of the components of the exemplary imaging device shown in FIG. 1, according to various embodiments of the present invention.
Figure 3:
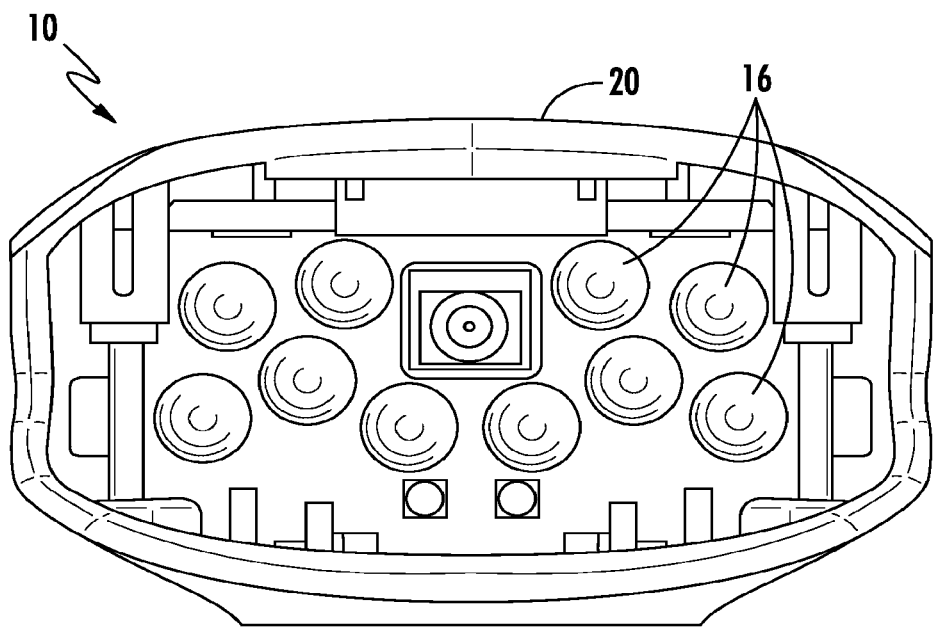
FIGS. 3 and 4 graphically depicts two cross sections of the exemplary imaging device shown in FIG. 1, according to various embodiments of the present invention.
Figure 4:
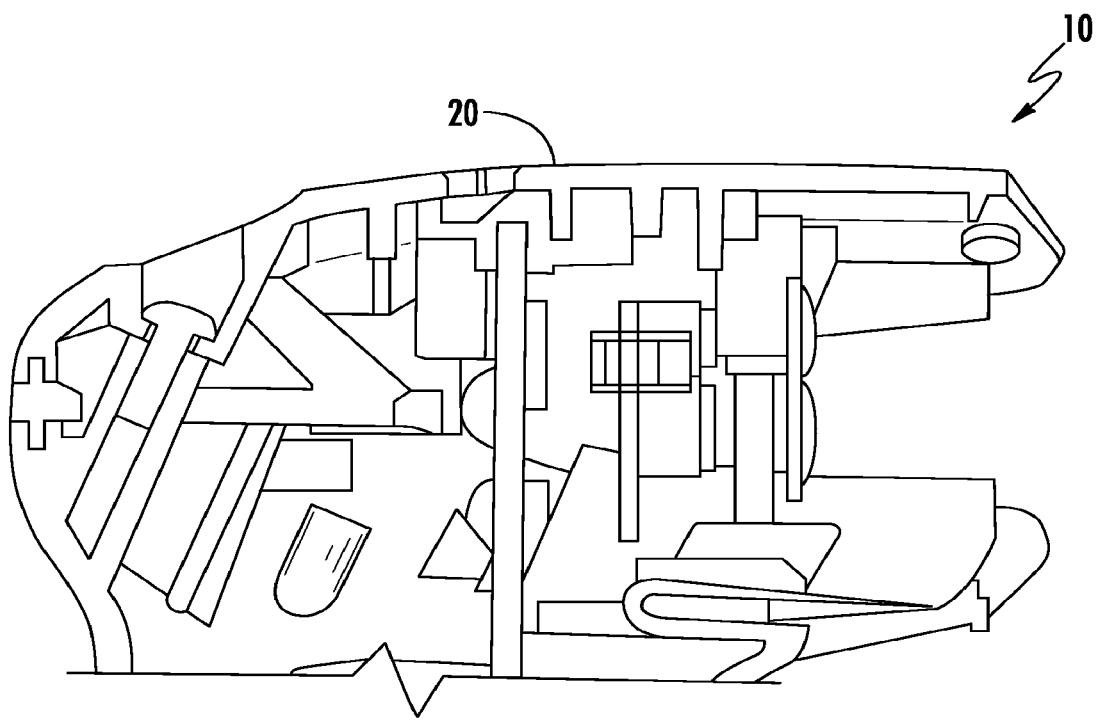
Figure 5:
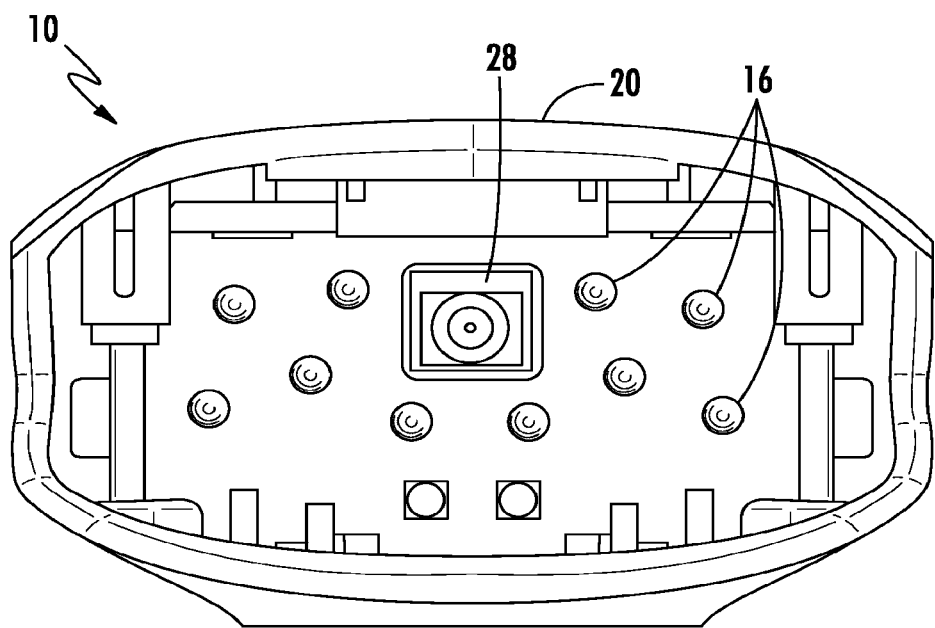
FIG. 5 graphically depicts a cross section of the exemplary imaging device of FIG. 1, illustrating exemplary locations of the various light sources and the monochromatic image sensor, according to various embodiments of the present invention.

Referring now to FIG. 2, according to various embodiments of the present invention, the imaging device 10 has an imaging subsystem 12 used in combination with multiplexed light sources 16 (e.g., see also FIGS. 3 and 5) of an illumination subsystem 14 to capture digital images of an object 15 (including but not limited to produce, retail merchandise, personal identification, currency, etc.). The imaging subsystem 12 and illumination subsystem 14 are contained within a housing 20 of the imaging device 10. The imaging device 10 generally comprises some or all of the following features: (i) positioning indication/guidance for operator use (i.e., aiming subsystem 40) (ii) a display 22 (FIG. 2), etc.); (iii) a communications subsystem 60 communicatively coupled to a point of sale (POS); and (iv) an energy storage/charging scheme. The imaging subsystem 12 and illumination subsystem 14 (FIG. 2) are typically optimized to a particular distance at which the object is illuminated and captured. The imaging device 10 allows a user to image objects in a variety of positions and orientations.

The imaging device 10 uses various colored light sources 16 (or light sources 16 with different spectral profiles) to illuminate the object. Filters 24 (FIG. 2) may be used to create light having different spectral profiles when combined with a broadband (e.g., white light) light source (or light-source combination). The filtering results from the filter's particular transmission, absorption, or reflectance characteristics.

Figure 6:
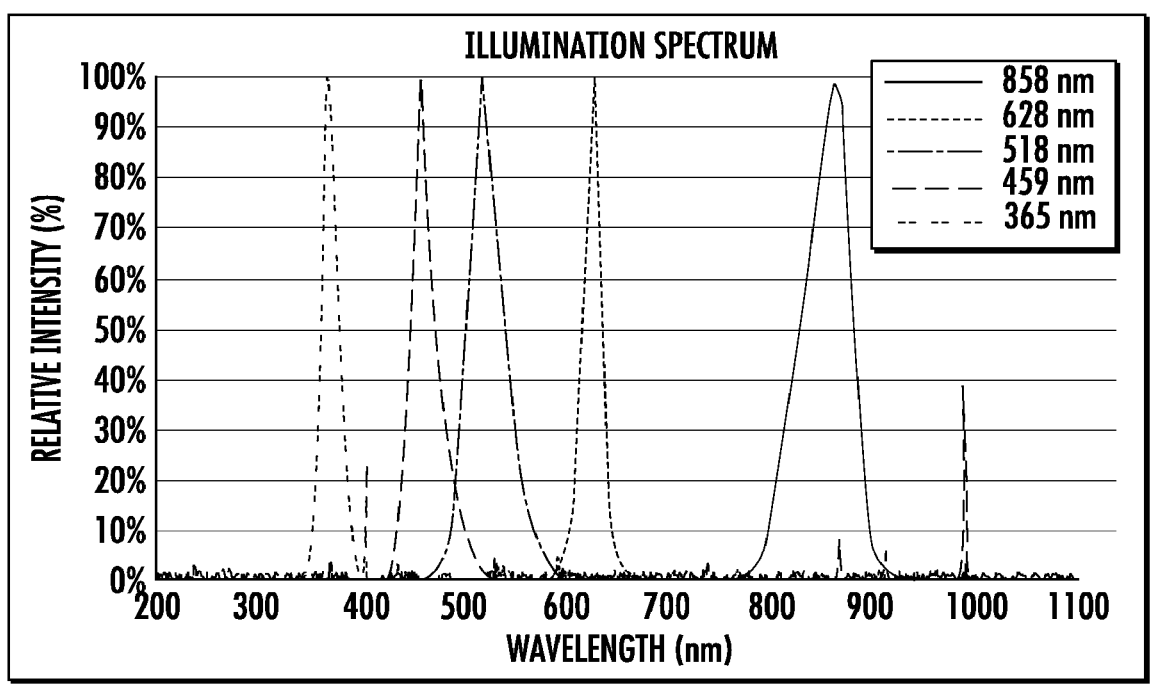
FIG. 6 graphically illustrates exemplary spectral profiles of the various light sources used in methods for constructing a color composite image, according to various embodiments of the present invention.

The imaging device 10 may use filters 24 of different construction and/or composition. For example, colored plastic (or glass) may be used or multilayer interference filters may be used. Colored plastic (or glass) filters are relatively insensitive to angular orientation, whereas interference filters may be highly sensitive to angular orientation. Control of the illumination's spectral profile (e.g., color) may be accomplished by controlling the filters 24 and/or the light sources 16 in the imaging device 10. In various embodiments, the filter (or filters) 24 may be positioned in front of a light source 16 and mechanically moved in and out of position to change the spectral profile of the illumination. In various embodiments, a multilayer filter may be positioned in front of a light source 16 and mechanically rotated to change the spectral profile of the illumination. This filter-tuning approach is especially useful with very narrow changes in peak emission wavelengths. In various embodiments, diffractive optical elements (e.g., gratings) may be used to produce illumination having different spectral profiles. In various embodiments, multiple light sources 16 (e.g., FIGS. 3 and 5) may be used to produce illumination of various spectral profiles, such as shown in FIG. 6. These multiple light sources may be individually controlled (i.e., turned on and off in various combinations) to produce different illumination spectral profiles.

In various embodiments embraced by the present invention, the various images may be obtained using optical filters 26 positioned in front of a monochromatic image sensor (i.e., in the return path) of the imaging subsystem 12. A benefit to using optical filters in this way is that the spectral profile of the light reaching the monochromatic image sensor 28 is controlled, even if ambient light levels vary (e.g., vary in intensity, color, etc.). The optical filters 26 used in the return path (i.e., receive path) of imaging subsystem 12 may be of various constructions and/or compositions. For example, colored (dies) plastic, colored glass, or interference (i.e., multilayer, dichroic, etc.) filters may be used. Colored plastics and glass filters are relatively insensitive to angular orientation, whereas interference filters may be highly sensitive to angular orientation.

In various embodiments, multiple optical filters 26 may be placed in the return path and may be mechanically moved in and out of position to change the spectral profile of the light reaching the monochromatic image sensor 28. In various embodiments, the angular orientation of an interference filter in front of the monochromatic image sensor 28 may be changed to tune the spectral profile precisely. Similarly, diffractive optical elements (e.g., gratings) may be used to filter the light reaching the monochromatic image sensor.

The imaging device 10 embraced by the present invention embraces the multispectral imaging of objects to construct color composite images. Multiple light sources 16 and/or filters 24 may be used to provide illumination having various spectral profiles. For each illumination, the imaging subsystem 12 may be controlled (i.e., exposure control) to capture digital images. The present invention embraces different methods for controlling multiple illumination devices (i.e., strings of LEDs, LED arrays, etc.), each having a different spectral profile. The multispectral illumination could be a simple RGB set of LEDs (three separate LED colors) or it could be a hyperspectral set of LEDs extending into the UV or IR ranges. Any combination of these LEDs can be flashed simultaneously or separately to capture different color image data using the monochrome image sensor.

The present invention embraces minimizing specular reflections from an object by controlling polarization of the illumination light and the light detected by the monochromatic image sensor 28. Specifically, the illumination light may be polarized in a particular direction and the light captured by the monochromatic image sensor is polarized in a direction orthogonal to the particular direction (if polarizers 30 and 32 are used). In this way, the light reflected from the object is filtered (i.e., by its polarization) to remove the polarization of the illuminating light. As diffuse reflected light is largely unpolarized, a portion of the diffuse reflected light will reach the monochromatic image sensor 28. As the specular reflected light is largely polarized in the direction of the illumination, the specular reflected light will be substantially blocked. In various embodiments, a linear polarizer may be positioned in front of the illumination subsystem and a crossed polarizer may be positioned in front of the monochromatic image sensor. In this way, very little light from the illuminator or from specular reflection is detected by the monochromatic image sensor.

Still referring to FIG. 2, according to various embodiments of the present invention, the imaging device 10 further comprises a processor 36 (also referred to herein as processing circuitry) communicatively coupled to the imaging subsystem 12 and the illumination subsystem 14. The processor 36 is configured by software 38 (stored, for example, in a storage device 42 or memory 44 of the imaging device 10) to activate one or more of the light sources 16 in the illumination subsystem 14 to illuminate the object 15 with light of a particular spectral band, capture a digital image of the illuminated object using the monochromatic image sensor to obtain a monochrome image, and repeat illuminating and capturing digital images until a plurality of digital monochrome images of the object have been captured, processing the plurality of monochrome images to generate image data for one or more output channels of a color composite image, and generate the color composite image from the image data. The storage device 42 of FIG. 2 is also depicted as including an operating system 46. "Output channels" may also be referred to herein as "display channels". Output channels comprise image data representing color. A color image comprises more than one output channel.

In various embodiments of the present invention, the imaging device 10 further comprises an aiming subsystem 40 capable of projecting two different targeting patterns, one for each of two modes of operation. In a first mode, one light pattern will be projected into the field of view (FOV) of the imaging device 10. If the mode of operation is changed, a different pattern will be projected. The targeting pattern may alert the operator of the mode and/or the mode change. The aiming subsystem 40 may be communicatively coupled to a mode-selection switch and has one or more aiming-light sources 41 and optics 43 for projecting (i) a first targeting pattern into the field of view when the imaging device is in indicia reading mode and (ii) a second targeting pattern into the field of view when the imaging device is in a color composite image construction mode as hereinafter described. The one or more aiming-light sources 41 may include a first laser for radiating light for the first targeting pattern and a second laser for radiating light for the second targeting pattern.

The aiming subsystem 40 may project the targeting pattern into the field of view using a variety of technologies (e.g., aperture, diffractive optical element (DOE), shaping optics, etc. (referred to collectively as projection optics 43 (FIG. 2)). A combination of technologies may also be used to create the two targeting patterns. In various embodiments, two diffractive rectangular patterns may be used. For barcodes, a pattern with a square aspect ratio could be projected, while for color composite image construction mode a pattern with a selected aspect ratio may be projected (e.g., 2×1 aspect ratio). In various embodiments, a red line pattern may be projected for barcodes, while a green line pattern may be projected for the color composite image construction mode. In various embodiments, a red rectangular area for barcodes may be projected from an LED, while a green crosshair is projected for color composite image construction mode from a DOE. The present invention envisions any combination of technology and patterns that produce easily visualized modes of operation.

The imaging device 10 envisioned by the present invention requires significant energy to provide the high-intensity illumination and fast image-capture necessary for operation. As a result, the current consumption required by the imaging device may exceed the current limits (e.g., 500 milliamps) of a typical power source 62 (e.g., USB) (FIG. 2). For example, current consumption of the illumination subsystem may exceed the power limits of a USB connector if multiple illuminations/image-captures are required.

The imaging device 10 may store energy in an optional energy storage element 50 (FIG. 2) during periods of rest (i.e., nonoperation) and then use the stored energy for illumination, when high current is required. In various embodiments, the optional energy storage element 50 is at least one super-capacitor capable of supplying the illumination subsystem energy without depleting the energy necessary for other operations (e.g., scanning). A typical super-capacitor has enough energy capacity for a sequence of illuminations (i.e., "flashes") before charging is required. In various embodiments, the optional energy storage element 50 may be a rechargeable battery. The battery may be charged when image capture is not required and then may be used to provide energy for the sequences of "flashes" during image capture.

The present invention also embraces integrating the optional energy storage element (or elements) 50 outside the housing 20 of the imaging device 10. For example, the storage element 50 may be incorporated inside the power/data cable of the imaging device 10. In this case, efficient charging may be accomplished using a current limiting resistor directly from the power source. The storage element may also be distributed along the cable, using the length of the cable and multiple layers to create a "cable battery" or "cable capacitor".

While various components of an exemplary imaging device (such as imaging device 10 of FIG. 1) are depicted in FIG. 2, it is to be understood that there may be a fewer or a greater number of components in the imaging device 10 and their location within and/or outside the imaging device may vary.

Figure 7:
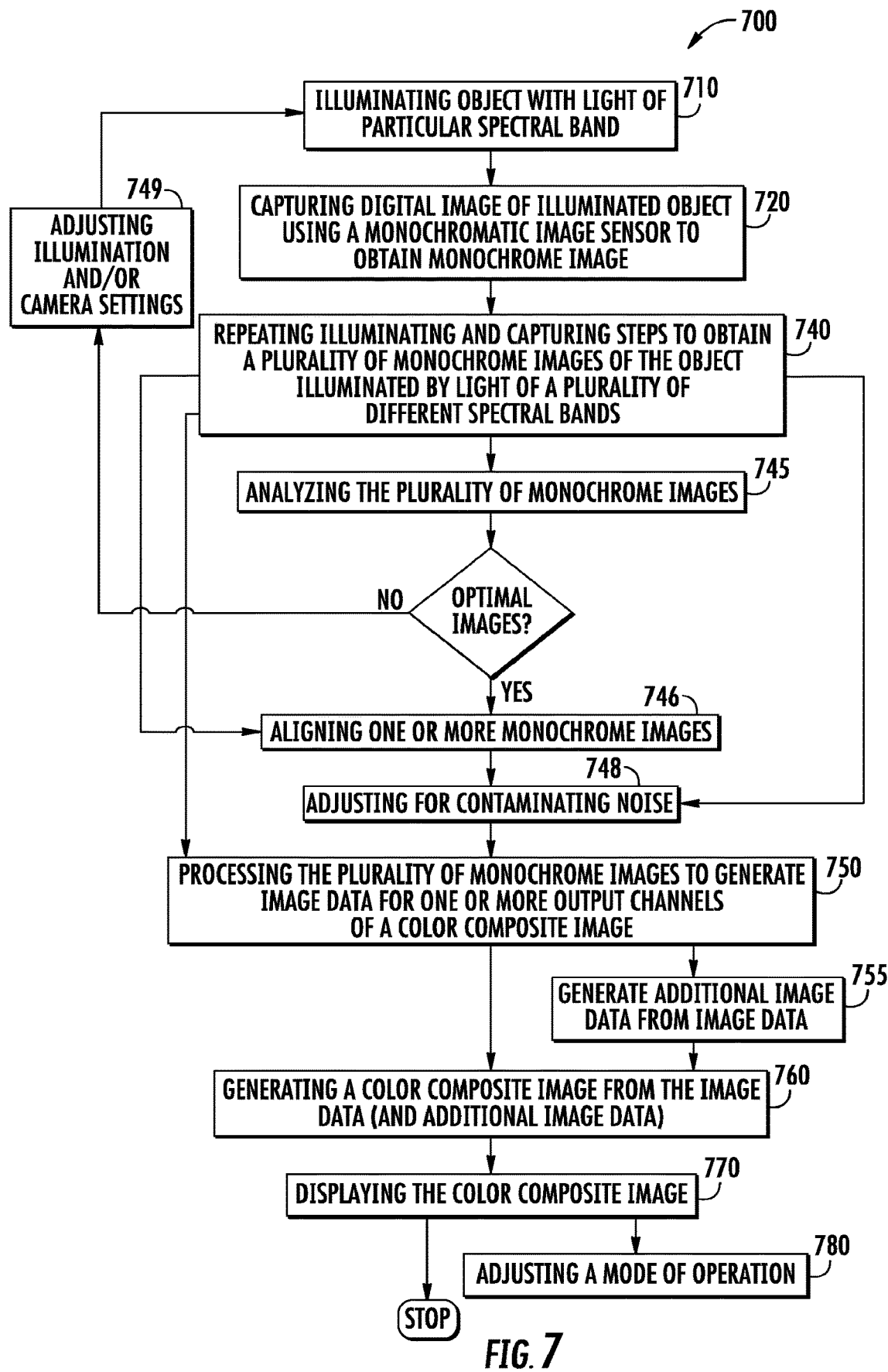
FIG. 7 is a flow diagram of a method for constructing a color composite image, according to various embodiments of the present invention.

Referring now to FIG. 7, according to various embodiments of the present invention, a method 700 for constructing a color composite image comprises illuminating, with an activated imaging device 10, the object 15 with light of a particular spectral band (step 710) ("applied illumination"). The object may be illuminated with light of a single spectral band or with light of one or more spectral bands at the same time. Illuminating the object with light of the particular spectral band comprises illuminating the object with at least one of visible and near-visible light. Illuminating the object with light of the particular spectral band may comprise illuminating the object with light having a bandwidth between about 10 to about 100 nanometers (i.e., individual spectral bands (in which the color is the same across the width of the spectral band) may be about 10 to about 100 nm wide). The number of different individual spectral bands used to illuminate the object is theoretically unlimited. Standard spectral bands may include red, green, and blue spectral bands, but other visible and/or non-visible spectral bands may be used to illuminate the object. Other individual spectral bands may include, for example, an ultraviolet spectral band, an infrared spectral band, a yellow spectral band, etc.

Still referring to FIG. 7, according to various embodiments of the present invention, the method 700 for constructing a color composite image continues by capturing a digital image of the illuminated object using the monochromatic image sensor 28 of the imaging device to obtain a monochrome image (step 720). A "monochrome image" is a digital representation of image data that does not have more than one spectral band. However, a monochrome image can be viewed on a defined color scale (e.g., a pink scale or a rainbow scale) as well as the typical grayscale.

Still referring to FIG. 7, according to various embodiments of the present invention, the method 700 for constructing a color composite image continues by repeating the illuminating and capturing steps to obtain a plurality of monochrome images of the object illuminated by light of a plurality of different spectral bands (i.e., capturing a plurality of digital monochrome images with a monochromatic image sensor, each digital monochrome image in the plurality of digital monochrome images illuminated with a different spectral band) (step 740). The captured images may be stored.

Still referring to FIG. 7, according to various embodiments of the present invention, the method 700 for constructing a composite image may continue, prior to processing the plurality of monochrome images to generate image data for one or more output channels, by analyzing the plurality of monochrome images (step 745). The plurality of monochrome images may be analyzed to determine if any (one or more) of the monochrome images needs to be aligned (step 746) and/or if at least one of an illumination setting and a camera setting for at least one monochrome image of the plurality of monochrome images needs adjustment (step 749).

If the results of the analysis (i.e., step 745) indicates sub-optimal image(s), at least one of the illumination setting and the camera setting for the at least one monochrome image may be adjusted based on the analysis (step 749). In step 749, illumination and/or camera settings of the imaging device 10 may be adjusted based on the analysis. In various embodiments of the present invention, the control methods provide variable sequences, durations, and intensities for multi-wavelength illumination. For example, the illumination may be controlled by adjusting the current for each LED array using DACs, programmable LED drivers (via serial interface), or PWM controls (duty cycle). In another example, the illumination may be controlled by adjusting the illumination time independently for each of the LED arrays. In another example, the illumination may be controlled by activating different LED arrays in a sequence or activating different LED arrays at the same time. In another example, the illumination may be controlled by adjusting the exposure time of the monochromatic image sensor 28 synchronously with illumination time and dependent on the type or spectral profile of LED arrays.

Other parameters that may be adjusted include illumination pulse characteristics (e.g. frequency, duty cycle, waveform), analog or digital gain, and sensor exposure time. The adjustment is determined by analyzing the images for image quality, such as brightness and signal to noise ratio. After adjustment, the method 700 for constructing a color composite image may return to step 710 as depicted before once again obtaining a plurality of monochrome images of the light illuminated by light of different spectral bands (step 740). Step 745 may be omitted in its entirety. The method 700 for constructing a color composite image may proceed directly from step 740 to 746, from step 740 to 748, or from step 740 to step 750 as depicted in FIG. 7.

If the images are determined to be optimal (i.e., requiring no adjustment of an illumination setting and/or a camera setting,), the method 700 for constructing a color composite image may proceed to step 746 of "Aligning one or more monochrome images" before proceeding to step 748 or the processing step (step 750). Step 748 may be omitted. In step 746, one or more of the monochrome images obtained in step 740 may be aligned to each other digitally.

Still referring to FIG. 7, according to various embodiments of the present invention, the method 700 for constructing a color composite image may continue by adjusting for contaminating noise in the one or more monochrome images (step 748). Adjusting for contaminating noise may occur during the processing step 750. Contaminating noise is from ambient light. Adjusting for contaminating noise comprises capturing a digital image of the object using the monochromatic image sensor without applied illumination to obtain a reference monochrome image that is representative of contaminating noise from ambient light. Capturing the digital image of the object without applied illumination (but with ambient illumination) may occur simultaneously with step 740. An unknown amplitude (A) of the contaminating noise is determined based on a difference in exposure time between a particular monochrome image and the reference monochrome image, with the difference in exposure time used to determine the unknown amplitude of the contaminating noise between the monochrome image and the reference monochrome image. The unknown amplitude may be the same or different in different monochrome images. The contaminating noise is then subtracted in the one or more monochrome images of the plurality of monochrome images (i.e., "subtracting" the contaminating noise comprises subtracting a scaled proportion of the reference monochrome image from each of the captured images, the scaled proportion being determined by the ratio of the captured image exposure to the reference monochrome image exposure). Capturing an image with only ambient illumination is useful. The ambient exposure itself could be called noise because it is uncontrolled. Subtracting it off from the other channels removes the uncontrolled component leaving only the controlled component. The optional "light source sensing subsystem" 70 and photodiode 72 of FIG. 2 can be used for subtracting ambient light from the other channels. The light source sensing subsystem 70 detects an additional aspect of the ambient light in order to make the subtraction more effective.

Still referring to FIG. 7, according to various embodiments of the present invention, the method 700 for constructing a color composite image continues by processing the plurality of monochrome images (after step 740) to generate image data for one or more output channels of the color composite image to be generated. The color composite image that is generated in step 760 from the image data as hereinafter described comprises the one or more output channels. The plurality of monochrome images is processed using an editing computer program that may be stored in the memory 44 of the imaging device 10, or elsewhere (e.g., a scanner, a PC, on a display device such as a tablet, etc.

Processing the plurality of monochrome images to generate image data comprises linearly combining, using the editing computer program, individual spectral bands or there may be higher order combinations thereof used to generate the image data. Processing the plurality of monochrome images to generate image data comprises processing one or more monochrome images of the plurality of monochrome images by at least one of mapping each particular spectral band in the one or more monochrome images to an output channel of the one or more output channels, adding a percentage of one monochrome image to another monochrome image, subtracting a percentage of one monochrome image from a different monochrome image, multiplying one monochrome image by a different monochrome image, dividing one monochrome image by a different monochrome image, applying a positive or negative multiplier to the one or more monochrome images, applying a positive or negative offset value to the one or more monochrome images, and applying a positive or negative exponent to the one or more monochrome images.

The primary elements of the step "processing digital images" would be independently scaling the different color images to the proper brightness and doing any color channel combinations desired to produce the true or false color image of interest (for example, subtracting off an ambient light component from the color channel).

The particular spectral bands can be mapped to the three visible output channels, red, green, and blue. For mapping each particular spectral band in the one or more monochrome images to an output channel of the one or more output channels, the simplest example is mapping the red-green-blue spectral bands in the one or more monochrome images to red-green-blue output channels of a red-green-blue color composite image. Starting with a monochrome image (a grayscale image) and using computer software, a color is assigned to each of the individual spectral bands. For example, infrared and UV spectral bands may be used for illuminating the object. The human eye is not sensitive to either infrared or ultraviolet. Therefore, to construct a color composite image that can be seen that includes image data about captured infrared light, the image data must be represented with colors that can be seen, i.e., red, green, and blue. Therefore, image data about the infrared light can be assigned the colors red, green, or blue. Red, green, or blue can be used to represent any of the wavelength ranges. One can make lots of color combinations. Making images with different band combinations, an individual can see more than otherwise. There can be images of a same scene, taken with light of different wavelengths. Wavelength ranges (spectral bands) are combined to generate the color composite image. Normalization of the output channels by one particular channel may be desired if there is a common spatially structured noise in the images. A normalized output channel is a single channel multiplied by the inverse of another channel or divided by the other channel and multiplied by a positive factor. Another example is simple channel substitution in which one color channel is substituted for another to generate a false color composite image. For example, an infrared spectral band may be substituted for red.

Adding a percentage of one monochrome image to another monochrome image comprises multiplying the pixel values of one monochrome image by a constant and adding those values to the corresponding pixels of another monochrome image.

Subtracting a percentage of one monochrome image from a different monochrome image comprises multiplying the pixel values of one monochrome image by a constant and subtracting those values from the corresponding pixels of another monochrome image.

Multiplying one monochrome image by a different monochrome image comprises multiplying the pixel values of one monochrome image by the corresponding pixel values of another monochrome image.

Dividing one monochrome image by a different monochrome image comprises dividing the pixel values of one monochrome image by the corresponding pixel values of another monochrome image.

Applying a positive or negative multiplier to the one or more monochrome images comprises multiplying the pixel values of the one or more monochrome images by a constant. A positive multiplier is any constant positive real number whereas a negative multiplier is any constant negative real number.

Applying a positive or negative offset value to the one or more monochrome images comprises adding a constant value to the pixel values of the one or more monochrome images.

Applying a positive or negative exponent to the one or more monochrome images comprises raising the pixel values of the one or more monochrome images to a constant power.

One of more of these processing steps may be repeated the same or a different number of times. Processing the one or more monochrome images may result in an adjustment to at least one of hue, saturation, lightness, chroma, intensity, contrast, and brightness of the composite image.

Still referring to FIG. 7, according to various embodiments of the present invention, the method 700 for constructing a color composite image continues by either generating a color composite image from the image data (step 760) or by generating additional image data for the one or more output channels from the image data (step 755) prior to generating the color composite image (step 760). Thus, the color composite image may be generated from image data and/or additional image data. Generating additional image data for the one or more output channels comprises using the editing computer software. Generating the additional image data comprises at least one of:

adding image data together;
subtracting image data from other image data;
multiplying image data by other image data;
dividing image data by other image data;
applying a positive or negative multiplier to image data;
applying a positive or negative offset value to image data; and
applying a positive or negative exponent to image data.

Adding image data together comprises adding the pixel values of image data to the pixel values of other image data.

Subtracting image data from other image data comprises subtracting the pixel values of image data from the pixel values of other image data.

Multiplying image data by other image data comprises multiplying the pixel values of image data by the pixel values of other image data.

Dividing image data by other image data comprises dividing the pixel values of image data by the pixel values of other image data.

Applying a positive or negative multiplier to image data comprises multiplying the pixel values of image data by a constant.

Applying a positive or negative offset value to image data comprises adding a constant to the pixel values of image data.

Applying a positive or negative exponent to image data comprises raising the pixel values of image data to a constant power.

Generating additional image data results in adjusting at least one of hue, saturation, lightness, chroma, intensity, contrast, and brightness of the color composite image.

Generating the color composite image from the image data and optionally, the additional image data comprises assigning the image data and additional image data to the one or more output channels. Step 750 of processing the one or more monochrome images comprises altering, scaling, combining spectral bands before assigning to one or more output channels. Assigning includes re-assigning to different one or more output channels. The one or more output channels may be the color display channels (red, green, and blue) that have visible wavelengths. Wavelengths we see as green are about 525-550 nanometers (nm) in length. Wavelengths we see as red are 630-700 nm in length. Wavelengths seen as blue are 450-495 nm. To generate the color composite image, three output channels may be produced, but the input to those three channels can be more than three spectral bands as previously noted. Various embodiments embrace how the output channels are generated.

While three output channels (red, green, and blue output channels) have been described, it may be possible to add a yellow output channel to the red, green blue output channels, resulting in a composite image that has a richer color than a composite image with just red, green, and blue output channels. The display 22 must be capable of handling four output channels.

In various embodiments, several "colors" of illumination may be flashed at once, while a reflected image may be obtained by illuminating the object with several narrow bands of light, with each illumination band being associated with an individual image as described above, various embodiments may be directed to illuminating with several bands of light at once, thereby allowing image combination (and false image construction) with fewer input monochrome images.

At least one image obtained by flashing several colors of illumination can be combined with another image (from a similar multi-band illumination). The images can then be mathematically combined (thru addition, subtraction, and/or scaled/multiplicative combinations, etc. as described above in the processing and generating steps) to derive a false color image. This approach could achieve similar "false color" images and feature detection (as previously described), but would require fewer overall (input) images and fewer exposures. One example would be to generate the first image while illuminating with red, green, and blue, and then generate a second image with blue illumination, and then mathematically combine the two images.

Still referring to FIG. 7, according to various embodiments of the present invention, the method 700 for constructing a composite image continues by displaying the color composite image (step 770). The color composite image is displayed on, for example, the display 22 for visualization.

Still referring to FIG. 7, according to various embodiments of the present invention, the method 700 for constructing a color composite image may further comprise adjusting a mode of operation (step 780) in the device by:

analyzing the object in the captured digital image for a machine-readable indicium (e.g., a barcode);

detecting the presence or absence of the machine-readable indicium within the captured digital image;

wherein if the machine-readable indicium is detected in the captured digital image, operating the device in the indicia-reading mode wherein digital images are automatically acquired and processed to read indicia;

wherein if the machine-readable indicium is not detected in the captured digital image, operating the imaging device in a different color construction mode wherein the digital images are automatically captured to generate the color composite image.

From the foregoing, it is to be appreciated that various embodiments provide methods for constructing a color composite image. Various embodiments provide different ways of combining different color channels to view different sources of image data across the electromagnetic spectrum.

To supplement the present disclosure, this application incorporates entirely by reference the following commonly assigned patents, patent application publications, and patent applications:

U.S. Pat. Nos. 6,832,725; 7,128,266;
U.S. Pat. Nos. 7,159,783; 7,413,127;
U.S. Pat. Nos. 7,726,575; 8,294,969;
U.S. Pat. Nos. 8,317,105; 8,322,622;
U.S. Pat. Nos. 8,366,005; 8,371,507;
U.S. Pat. Nos. 8,376,233; 8,381,979;
U.S. Pat. Nos. 8,390,909; 8,408,464;
U.S. Pat. Nos. 8,408,468; 8,408,469;
U.S. Pat. Nos. 8,424,768; 8,448,863;
U.S. Pat. Nos. 8,457,013; 8,459,557;
U.S. Pat. Nos. 8,469,272; 8,474,712;
U.S. Pat. Nos. 8,479,992; 8,490,877;
U.S. Pat. Nos. 8,517,271; 8,523,076;
U.S. Pat. Nos. 8,528,818; 8,544,737;
U.S. Pat. Nos. 8,548,242; 8,548,420;
U.S. Pat. Nos. 8,550,335; 8,550,354;
U.S. Pat. Nos. 8,550,357; 8,556,174;
U.S. Pat. Nos. 8,556,176; 8,556,177;
U.S. Pat. Nos. 8,559,767; 8,599,957;
U.S. Pat. Nos. 8,561,895; 8,561,903;
U.S. Pat. Nos. 8,561,905; 8,565,107;
U.S. Pat. Nos. 8,571,307; 8,579,200;
U.S. Pat. Nos. 8,583,924; 8,584,945;
U.S. Pat. Nos. 8,587,595; 8,587,697;
U.S. Pat. Nos. 8,588,869; 8,590,789;
U.S. Pat. Nos. 8,596,539; 8,596,542;
U.S. Pat. Nos. 8,596,543; 8,599,271;
U.S. Pat. Nos. 8,599,957; 8,600,158;
U.S. Pat. Nos. 8,600,167; 8,602,309;
U.S. Pat. Nos. 8,608,053; 8,608,071;
U.S. Pat. Nos. 8,611,309; 8,615,487;
U.S. Pat. Nos. 8,616,454; 8,621,123;
U.S. Pat. Nos. 8,622,303; 8,628,013;
U.S. Pat. Nos. 8,628,015; 8,628,016;
U.S. Pat. Nos. 8,629,926; 8,630,491;
U.S. Pat. Nos. 8,635,309; 8,636,200;
U.S. Pat. Nos. 8,636,212; 8,636,215;
U.S. Pat. Nos. 8,636,224; 8,638,806;
U.S. Pat. Nos. 8,640,958; 8,640,960;
U.S. Pat. Nos. 8,643,717; 8,646,692;
U.S. Pat. Nos. 8,646,694; 8,657,200;
U.S. Pat. Nos. 8,659,397; 8,668,149;
U.S. Pat. Nos. 8,678,285; 8,678,286;
U.S. Pat. Nos. 8,682,077; 8,687,282;
U.S. Pat. Nos. 8,692,927; 8,695,880;
U.S. Pat. Nos. 8,698,949; 8,717,494;
U.S. Pat. Nos. 8,717,494; 8,720,783;
U.S. Pat. Nos. 8,723,804; 8,723,904;
U.S. Pat. Nos. 8,727,223; 8,740,082;
U.S. Pat. Nos. 8,740,085; 8,746,563;
U.S. Pat. Nos. 8,750,445; 8,752,766;
U.S. Pat. Nos. 8,756,059; 8,757,495;
U.S. Pat. Nos. 8,760,563; 8,763,909;
U.S. Pat. Nos. 8,777,108; 8,777,109;
U.S. Pat. Nos. 8,779,898; 8,781,520;
U.S. Pat. Nos. 8,783,573; 8,789,757;
U.S. Pat. Nos. 8,789,758; 8,789,759;
U.S. Pat. Nos. 8,794,520; 8,794,522;
U.S. Pat. Nos. 8,794,525; 8,794,526;
U.S. Pat. Nos. 8,798,367; 8,807,431;
U.S. Pat. Nos. 8,807,432; 8,820,630;
U.S. Pat. Nos. 8,822,848; 8,824,692;
U.S. Pat. Nos. 8,824,696; 8,842,849;
U.S. Pat. Nos. 8,844,822; 8,844,823;
U.S. Pat. Nos. 8,849,019; 8,851,383;
U.S. Pat. Nos. 8,854,633; 8,866,963;
U.S. Pat. Nos. 8,868,421; 8,868,519;
U.S. Pat. Nos. 8,868,802; 8,868,803;
U.S. Pat. Nos. 8,870,074; 8,879,639;
U.S. Pat. Nos. 8,880,426; 8,881,983;
U.S. Pat. Nos. 8,881,987; 8,903,172;
U.S. Pat. Nos. 8,908,995; 8,910,870;
U.S. Pat. Nos. 8,910,875; 8,914,290;
U.S. Pat. Nos. 8,914,788; 8,915,439;
U.S. Pat. Nos. 8,915,444; 8,916,789;

U.S. Pat. Nos. 8,918,250; 8,918,564;
U.S. Pat. Nos. 8,925,818; 8,939,374;
U.S. Pat. Nos. 8,942,480; 8,944,313;
U.S. Pat. Nos. 8,944,327; 8,944,332;
U.S. Pat. Nos. 8,950,678; 8,967,468;
U.S. Pat. Nos. 8,971,346; 8,976,030;
U.S. Pat. Nos. 8,976,368; 8,978,981;
U.S. Pat. Nos. 8,978,983; 8,978,984;
U.S. Pat. Nos. 8,985,456; 8,985,457;
U.S. Pat. Nos. 8,985,459; 8,985,461;
U.S. Pat. Nos. 8,988,578; 8,988,590;
U.S. Pat. Nos. 8,991,704; 8,996,194;
U.S. Pat. Nos. 8,996,384; 9,002,641;
U.S. Pat. Nos. 9,007,368; 9,010,641;
U.S. Pat. Nos. 9,015,513; 9,016,576;
U.S. Pat. Nos. 9,022,288; 9,030,964;
U.S. Pat. Nos. 9,033,240; 9,033,242;
U.S. Pat. Nos. 9,036,054; 9,037,344;
U.S. Pat. Nos. 9,038,911; 9,038,915;
U.S. Pat. Nos. 9,047,098; 9,047,359;
U.S. Pat. Nos. 9,047,420; 9,047,525;
U.S. Pat. Nos. 9,047,531; 9,053,055;
U.S. Pat. Nos. 9,053,378; 9,053,380;
U.S. Pat. Nos. 9,058,526; 9,064,165;
U.S. Pat. Nos. 9,064,165; 9,064,167;
U.S. Pat. Nos. 9,064,168; 9,064,254;
U.S. Pat. Nos. 9,066,032; 9,070,032;
U.S. Pat. Nos. 9,076,459; 9,079,423;
U.S. Pat. Nos. 9,080,856; 9,082,023;
U.S. Pat. Nos. 9,082,031; 9,084,032;
U.S. Pat. Nos. 9,087,250; 9,092,681;
U.S. Pat. Nos. 9,092,682; 9,092,683;
U.S. Pat. Nos. 9,093,141; 9,098,763;
U.S. Pat. Nos. 9,104,929; 9,104,934;
U.S. Pat. Nos. 9,107,484; 9,111,159;
U.S. Pat. Nos. 9,111,166; 9,135,483;
U.S. Pat. Nos. 9,137,009; 9,141,839;
U.S. Pat. Nos. 9,147,096; 9,148,474;
U.S. Pat. Nos. 9,158,000; 9,158,340;
U.S. Pat. Nos. 9,158,953; 9,159,059;
U.S. Pat. Nos. 9,165,174; 9,171,543;
U.S. Pat. Nos. 9,183,425; 9,189,669;
U.S. Pat. Nos. 9,195,844; 9,202,458;
U.S. Pat. Nos. 9,208,366; 9,208,367;
U.S. Pat. Nos. 9,219,836; 9,224,024;
U.S. Pat. Nos. 9,224,027; 9,230,140;
U.S. Pat. Nos. 9,235,553; 9,239,950;
U.S. Pat. Nos. 9,245,492; 9,248,640;
U.S. Pat. Nos. 9,250,652; 9,250,712;
U.S. Pat. Nos. 9,251,411; 9,258,033;
U.S. Pat. Nos. 9,262,633; 9,262,660;
U.S. Pat. Nos. 9,262,662; 9,269,036;
U.S. Pat. Nos. 9,270,782; 9,274,812;
U.S. Pat. Nos. 9,275,388; 9,277,668;
U.S. Pat. Nos. 9,280,693; 9,286,496;
U.S. Pat. Nos. 9,298,964; 9,301,427;
U.S. Pat. Nos. 9,313,377; 9,317,037;
U.S. Pat. Nos. 9,319,548; 9,342,723;
U.S. Pat. Nos. 9,361,882; 9,365,381;
U.S. Pat. Nos. 9,373,018; 9,375,945;
U.S. Pat. Nos. 9,378,403; 9,383,848;
U.S. Pat. Nos. 9,384,374; 9,390,304;
U.S. Pat. Nos. 9,390,596; 9,411,386;
U.S. Pat. Nos. 9,412,242; 9,418,269;
U.S. Pat. Nos. 9,418,270; 9,465,967;
U.S. Pat. Nos. 9,423,318; 9,424,454;
U.S. Pat. Nos. 9,436,860; 9,443,123;
U.S. Pat. Nos. 9,443,222; 9,454,689;
U.S. Pat. Nos. 9,464,885; 9,465,967;
U.S. Pat. Nos. 9,478,983; 9,481,186;
U.S. Pat. Nos. 9,487,113; 9,488,986;
U.S. Pat. Nos. 9,489,782; 9,490,540;
U.S. Pat. Nos. 9,491,729; 9,497,092;
U.S. Pat. Nos. 9,507,974; 9,519,814;
U.S. Pat. Nos. 9,521,331; 9,530,038;
U.S. Pat. Nos. 9,572,901; 9,558,386;
U.S. Pat. Nos. 9,606,581; 9,646,189;
U.S. Pat. Nos. 9,646,191; 9,652,648;
U.S. Pat. Nos. 9,652,653; 9,656,487;
U.S. Pat. Nos. 9,659,198; 9,680,282;
U.S. Pat. Nos. 9,697,401; 9,701,140;
U.S. Design Patent No. D702,237;
U.S. Design Patent No. D716,285;
U.S. Design Patent No. D723,560;
U.S. Design Patent No. D730,357;
U.S. Design Patent No. D730,901;
U.S. Design Patent No. D730,902;
U.S. Design Patent No. D734,339;
U.S. Design Patent No. D737,321;
U.S. Design Patent No. D754,205;
U.S. Design Patent No. D754,206;
U.S. Design Patent No. D757,009;
U.S. Design Patent No. D760,719;
U.S. Design Patent No. D762,604;
U.S. Design Patent No. D766,244;
U.S. Design Patent No. D777,166;
U.S. Design Patent No. D771,631;
U.S. Design Patent No. D783,601;
U.S. Design Patent No. D785,617;
U.S. Design Patent No. D785,636;
U.S. Design Patent No. D790,505;
U.S. Design Patent No. D790,546;
International Publication No. 2013/163789;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0194692;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;

U.S. Patent Application Publication No. 2013/0308625;
U.S. Patent Application Publication No. 2013/0313324;
U.S. Patent Application Publication No. 2013/0332996;
U.S. Patent Application Publication No. 2014/0001267;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131443;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0191684;
U.S. Patent Application Publication No. 2014/0191913;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0231500;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0332590;
U.S. Patent Application Publication No. 2014/0351317;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0009338;
U.S. Patent Application Publication No. 2015/0014416;
U.S. Patent Application Publication No. 2015/0021397;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0049347;
U.S. Patent Application Publication No. 2015/0051992;
U.S. Patent Application Publication No. 2015/0053769;
U.S. Patent Application Publication No. 2015/0062366;
U.S. Patent Application Publication No. 2015/0063215;
U.S. Patent Application Publication No. 2015/0088522;
U.S. Patent Application Publication No. 2015/0096872;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0149946;
U.S. Patent Application Publication No. 2015/0161429;
U.S. Patent Application Publication No. 2015/0178523;
U.S. Patent Application Publication No. 2015/0178537;
U.S. Patent Application Publication No. 2015/0178685;
U.S. Patent Application Publication No. 2015/0181109;
U.S. Patent Application Publication No. 2015/0199957;
U.S. Patent Application Publication No. 2015/0210199;
U.S. Patent Application Publication No. 2015/0212565;
U.S. Patent Application Publication No. 2015/0213647;
U.S. Patent Application Publication No. 2015/0220753;
U.S. Patent Application Publication No. 2015/0220901;
U.S. Patent Application Publication No. 2015/0227189;
U.S. Patent Application Publication No. 2015/0236984;
U.S. Patent Application Publication No. 2015/0239348;
U.S. Patent Application Publication No. 2015/0242658;
U.S. Patent Application Publication No. 2015/0248572;
U.S. Patent Application Publication No. 2015/0254485;
U.S. Patent Application Publication No. 2015/0261643;
U.S. Patent Application Publication No. 2015/0264624;
U.S. Patent Application Publication No. 2015/0268971;
U.S. Patent Application Publication No. 2015/0269402;
U.S. Patent Application Publication No. 2015/0288689;
U.S. Patent Application Publication No. 2015/0288896;
U.S. Patent Application Publication No. 2015/0310243;
U.S. Patent Application Publication No. 2015/0310244;
U.S. Patent Application Publication No. 2015/0310389;
U.S. Patent Application Publication No. 2015/0312780;
U.S. Patent Application Publication No. 2015/0327012;
U.S. Patent Application Publication No. 2016/0014251;
U.S. Patent Application Publication No. 2016/0025697;
U.S. Patent Application Publication No. 2016/0026838;
U.S. Patent Application Publication No. 2016/0026839;
U.S. Patent Application Publication No. 2016/0040982;
U.S. Patent Application Publication No. 2016/0042241;
U.S. Patent Application Publication No. 2016/0057230;
U.S. Patent Application Publication No. 2016/0062473;
U.S. Patent Application Publication No. 2016/0070944;
U.S. Patent Application Publication No. 2016/0092805;
U.S. Patent Application Publication No. 2016/0101936;
U.S. Patent Application Publication No. 2016/0104019;

U.S. Patent Application Publication No. 2016/0104274;
U.S. Patent Application Publication No. 2016/0109219;
U.S. Patent Application Publication No. 2016/0109220;
U.S. Patent Application Publication No. 2016/0109224;
U.S. Patent Application Publication No. 2016/0112631;
U.S. Patent Application Publication No. 2016/0112643;
U.S. Patent Application Publication No. 2016/0117627;
U.S. Patent Application Publication No. 2016/0124516;
U.S. Patent Application Publication No. 2016/0125217;
U.S. Patent Application Publication No. 2016/0125342;
U.S. Patent Application Publication No. 2016/0125873;
U.S. Patent Application Publication No. 2016/0133253;
U.S. Patent Application Publication No. 2016/0171597;
U.S. Patent Application Publication No. 2016/0171666;
U.S. Patent Application Publication No. 2016/0171720;
U.S. Patent Application Publication No. 2016/0171775;
U.S. Patent Application Publication No. 2016/0171777;
U.S. Patent Application Publication No. 2016/0174674;
U.S. Patent Application Publication No. 2016/0178479;
U.S. Patent Application Publication No. 2016/0178685;
U.S. Patent Application Publication No. 2016/0178707;
U.S. Patent Application Publication No. 2016/0179132;
U.S. Patent Application Publication No. 2016/0179143;
U.S. Patent Application Publication No. 2016/0179368;
U.S. Patent Application Publication No. 2016/0179378;
U.S. Patent Application Publication No. 2016/0180130;
U.S. Patent Application Publication No. 2016/0180133;
U.S. Patent Application Publication No. 2016/0180136;
U.S. Patent Application Publication No. 2016/0180594;
U.S. Patent Application Publication No. 2016/0180663;
U.S. Patent Application Publication No. 2016/0180678;
U.S. Patent Application Publication No. 2016/0180713;
U.S. Patent Application Publication No. 2016/0185136;
U.S. Patent Application Publication No. 2016/0185291;
U.S. Patent Application Publication No. 2016/0186926;
U.S. Patent Application Publication No. 2016/0188861;
U.S. Patent Application Publication No. 2016/0188939;
U.S. Patent Application Publication No. 2016/0188940;
U.S. Patent Application Publication No. 2016/0188941;
U.S. Patent Application Publication No. 2016/0188942;
U.S. Patent Application Publication No. 2016/0188943;
U.S. Patent Application Publication No. 2016/0188944;
U.S. Patent Application Publication No. 2016/0189076;
U.S. Patent Application Publication No. 2016/0189087;
U.S. Patent Application Publication No. 2016/0189088;
U.S. Patent Application Publication No. 2016/0189092;
U.S. Patent Application Publication No. 2016/0189284;
U.S. Patent Application Publication No. 2016/0189288;
U.S. Patent Application Publication No. 2016/0189366;
U.S. Patent Application Publication No. 2016/0189443;
U.S. Patent Application Publication No. 2016/0189447;
U.S. Patent Application Publication No. 2016/0189489;
U.S. Patent Application Publication No. 2016/0192051;
U.S. Patent Application Publication No. 2016/0202951;
U.S. Patent Application Publication No. 2016/0202958;
U.S. Patent Application Publication No. 2016/0202959;
U.S. Patent Application Publication No. 2016/0203021;
U.S. Patent Application Publication No. 2016/0203429;
U.S. Patent Application Publication No. 2016/0203797;
U.S. Patent Application Publication No. 2016/0203820;
U.S. Patent Application Publication No. 2016/0204623;
U.S. Patent Application Publication No. 2016/0204636;
U.S. Patent Application Publication No. 2016/0204638;
U.S. Patent Application Publication No. 2016/0227912;
U.S. Patent Application Publication No. 2016/0232891;
U.S. Patent Application Publication No. 2016/0292477;
U.S. Patent Application Publication No. 2016/0294779;
U.S. Patent Application Publication No. 2016/0306769;
U.S. Patent Application Publication No. 2016/0314276;
U.S. Patent Application Publication No. 2016/0314294;
U.S. Patent Application Publication No. 2016/0316190;
U.S. Patent Application Publication No. 2016/0323310;
U.S. Patent Application Publication No. 2016/0325677;
U.S. Patent Application Publication No. 2016/0327614;
U.S. Patent Application Publication No. 2016/0327930;
U.S. Patent Application Publication No. 2016/0328762;
U.S. Patent Application Publication No. 2016/0330218;
U.S. Patent Application Publication No. 2016/0343163;
U.S. Patent Application Publication No. 2016/0343176;
U.S. Patent Application Publication No. 2016/0364914;
U.S. Patent Application Publication No. 2016/0370220;
U.S. Patent Application Publication No. 2016/0372282;
U.S. Patent Application Publication No. 2016/0373847;
U.S. Patent Application Publication No. 2016/0377414;
U.S. Patent Application Publication No. 2016/0377417;
U.S. Patent Application Publication No. 2017/0010141;
U.S. Patent Application Publication No. 2017/0010328;
U.S. Patent Application Publication No. 2017/0010780;
U.S. Patent Application Publication No. 2017/0016714;
U.S. Patent Application Publication No. 2017/0018094;
U.S. Patent Application Publication No. 2017/0046603;
U.S. Patent Application Publication No. 2017/0047864;
U.S. Patent Application Publication No. 2017/0053146;
U.S. Patent Application Publication No. 2017/0053147;
U.S. Patent Application Publication No. 2017/0053647;
U.S. Patent Application Publication No. 2017/0055606;
U.S. Patent Application Publication No. 2017/0060316;
U.S. Patent Application Publication No. 2017/0061961;
U.S. Patent Application Publication No. 2017/0064634;
U.S. Patent Application Publication No. 2017/0083730;
U.S. Patent Application Publication No. 2017/0091502;
U.S. Patent Application Publication No. 2017/0091706;
U.S. Patent Application Publication No. 2017/0091741;
U.S. Patent Application Publication No. 2017/0091904;
U.S. Patent Application Publication No. 2017/0092908;
U.S. Patent Application Publication No. 2017/0094238;
U.S. Patent Application Publication No. 2017/0098947;
U.S. Patent Application Publication No. 2017/0100949;
U.S. Patent Application Publication No. 2017/0108838;
U.S. Patent Application Publication No. 2017/0108895;
U.S. Patent Application Publication No. 2017/0118355;
U.S. Patent Application Publication No. 2017/0123598;
U.S. Patent Application Publication No. 2017/0124369;
U.S. Patent Application Publication No. 2017/0124396;
U.S. Patent Application Publication No. 2017/0124687;
U.S. Patent Application Publication No. 2017/0126873;
U.S. Patent Application Publication No. 2017/0126904;
U.S. Patent Application Publication No. 2017/0139012;
U.S. Patent Application Publication No. 2017/0140329;
U.S. Patent Application Publication No. 2017/0140731;
U.S. Patent Application Publication No. 2017/0147847;
U.S. Patent Application Publication No. 2017/0150124;
U.S. Patent Application Publication No. 2017/0169198;
U.S. Patent Application Publication No. 2017/0171035;
U.S. Patent Application Publication No. 2017/0171703;
U.S. Patent Application Publication No. 2017/0171803;
U.S. Patent Application Publication No. 2017/0180359;
U.S. Patent Application Publication No. 2017/0180577;
U.S. Patent Application Publication No. 2017/0181299;
U.S. Patent Application Publication No. 2017/0190192;
U.S. Patent Application Publication No. 2017/0193432;
U.S. Patent Application Publication No. 2017/0193461;
U.S. Patent Application Publication No. 2017/0193727;
U.S. Patent Application Publication No. 2017/0199266;

U.S. Patent Application Publication No. 2017/0200108; and U.S. Patent Application Publication No. 2017/0200275.

In the specification and/or figures, typical embodiments of the present invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method for constructing a composite image, the method comprising:
    illuminating an object with light of a particular spectral band;
    capturing a digital image of the illuminated object using a monochromatic image sensor of an imaging device to obtain a monochrome image;
    repeating the steps of illuminating and capturing to obtain a plurality of monochrome images of the object illuminated by light of a plurality of different spectral bands;
    aligning the plurality of monochrome images;
    analyzing the plurality of monochrome images;
    determining whether at least one of an illumination setting and a camera setting for the plurality of monochrome images needs adjustment;
    adjusting at least one of the illumination setting and the camera setting for the plurality of monochrome images depending upon the determination;
    processing the plurality of monochrome images to generate image data for one or more output channels; and
    generating a color composite image from the image data, the color composite image comprising the one or more output channels.

2. The method according to claim 1, wherein illuminating the object with light of the particular spectral band comprises at least one of: illuminating the object with light of a single spectral band or illuminating the object with light of one or more spectral bands at the same time.

3. The method according to claim 1, wherein illuminating the object with light of the particular spectral band comprises illuminating the object with at least one of visible and near-visible light.

4. The method according to claim 1, wherein illuminating the object with light of the particular spectral band comprises illuminating the object with light having a bandwidth between about 10 to about 100 nanometers.

5. The method according to claim 1, further comprising, after adjusting at least one of the illumination setting and the camera setting:
    repeating the steps of illuminating and capturing to obtain the plurality of monochrome images of the object illuminated by light of the plurality of different spectral bands.

6. The method according to claim 1, further comprising:
    capturing another digital image of the object using the monochromatic image sensor without applied illumination to obtain a reference monochrome image that is representative of contaminating noise from ambient light;
    determining an unknown amplitude (A) of the contaminating noise based on a difference in exposure time between a particular monochrome image and the reference monochrome image, with the difference in exposure time used to determine the unknown amplitude of the contaminating noise between the particular monochrome image and the reference monochrome image; and
    subtracting the contaminating noise in one or more monochrome images of the plurality of monochrome images.

7. The method according to claim 6, wherein the unknown amplitude is different in different monochrome images.

8. The method according to claim 1, wherein processing the plurality of monochrome images to generate the image data comprises processing one or more monochrome images of the plurality of monochrome images by at least one of:
    mapping each particular spectral band in the one or more monochrome images to an output channel of the one or more output channels;
    adding a percentage of one monochrome image to another monochrome image;
    subtracting the percentage of the one monochrome image from a different monochrome image;
    multiplying the one monochrome image by a different monochrome image;
    dividing the one monochrome image by a different monochrome image;
    applying a positive or negative multiplier to the one or more monochrome images;
    applying a positive or negative offset value to the one or more monochrome images; and
    applying a positive or negative exponent to the one or more monochrome images.

9. The method according to claim 8, further comprising generating additional image data for the one or more output channels from the image data, wherein generating the additional image data comprises at least one of:
    adding the image data together;
    subtracting the image data from other image data;
    multiplying the image data by other image data;
    dividing the image data by other image data;
    applying a positive or negative multiplier to the image data;
    applying a positive or negative offset value to the image data; and
    applying a positive or negative exponent to the image data.

10. The method according to claim 1, wherein generating the color composite image from the image data comprises:
    assigning the image data to the one or more output channels.

11. The method according to claim 9, wherein generating the color composite image from the image data comprises generating the color composite image from the image data generated from processing the one or more monochrome images and from the additional image data.

12. The method according to claim 11, wherein processing the one or more monochrome images and generating the additional image data results in adjusting at least one of hue, saturation, lightness, chroma, intensity, contrast, and brightness of the color composite image.

13. A method for constructing a color composite image comprising:
    capturing a plurality of digital monochrome images with a monochromatic image sensor, each digital monochrome image in the plurality of digital monochrome images illuminated with a different spectral band;
    aligning the plurality of digital monochrome images;
    analyzing the plurality of digital monochrome images;
    determining whether at least one of an illumination setting and a camera setting for the plurality of digital monochrome images needs adjustment;

adjusting at least one of the illumination setting and the camera setting for the plurality of digital monochrome images depending upon the determination;

processing the plurality of digital monochrome images to generate image data for one or more output channels; and generating the color composite image from the image data, the color composite image comprising the one or more output channels.

14. The method according to claim 13, wherein processing the plurality of digital monochrome images to generate the image data comprises processing one or more digital monochrome images of the plurality of digital monochrome images by at least one of:

mapping each particular spectral band in the one or more digital monochrome images to an output channel of the one or more output channels;

adding a percentage of one digital monochrome image to another digital monochrome image;

subtracting the percentage of the one digital monochrome image from a different digital monochrome image;

multiplying the one digital monochrome image by a different digital monochrome image;

dividing the one digital monochrome image by a different digital monochrome image;

applying a positive or negative multiplier to the one or more digital monochrome images;

applying a positive or negative offset value to the one or more digital monochrome images; and applying a positive or negative exponent to the one or more digital monochrome images.

15. The method according to claim 14, further comprising generating additional image data for the one or more output channels from the image data, wherein generating the additional image data comprises at least one of:

adding the image data together;

subtracting the image data from other image data;

multiplying the image data by other image data;

dividing the image data by other image data;

applying a positive or negative multiplier to the image data;

applying a positive or negative offset value to the image data; and applying a positive or negative exponent to the image data.

16. The method according to claim 13, wherein generating the color composite image from the image data comprises:

assigning the image data to the one or more output channels.

17. The method according to claim 15, wherein generating the color composite image from the image data comprises generating the color composite image from the image data generated from processing the one or more digital monochrome images and from the additional image data.

18. The method according to claim 17, wherein processing the one or more digital monochrome images and generating the additional image data results in adjusting at least one of hue, saturation, lightness, chroma, intensity, contrast, and brightness of the false color composite image.

19. The method according to claim 14, wherein adding the percentage of the one digital monochrome image to another digital monochrome image comprises multiplying pixel values of the one digital monochrome image by a constant and adding result values of the multiplication to the corresponding pixels of another monochrome image.

* * * * *